US008335367B2

(12) United States Patent
Nireki

(10) Patent No.: US 8,335,367 B2
(45) Date of Patent: Dec. 18, 2012

(54) BANKNOTE PROCESSING DEVICE AND AUTHENTICATION DETERMINING AND PROCESSING METHOD

(75) Inventor: Takao Nireki, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 375 days.

(21) Appl. No.: 12/864,454

(22) PCT Filed: Jan. 23, 2009

(86) PCT No.: PCT/JP2009/051129

§ 371 (c)(1), (2), (4) Date: Jul. 23, 2010

(87) PCT Pub. No.: WO2009/093717

PCT Pub. Date: Jul. 30, 2009

(65) Prior Publication Data

US 2010/0303333 A1 Dec. 2, 2010

(30) Foreign Application Priority Data

Jan. 25, 2008 (JP) ................................ 2008-015303

(51) Int. Cl.
*G06K 9/00* (2006.01)

(52) U.S. Cl. .......... 382/135; 209/534; 235/379; 356/71; 902/7; 348/135

(58) Field of Classification Search .................. 382/100, 382/135, 136, 137, 138, 139, 140, 181, 190, 382/195, 199; 194/4; 209/534; 235/379; 356/71; 902/7; 348/92, 135
See application file for complete search history.

(56) References Cited

U.S. PATENT DOCUMENTS

| | | | | |
|---|---|---|---|---|
| 5,420,406 | A * | 5/1995 | Izawa et al. | 235/379 |
| 6,050,387 | A * | 4/2000 | Iwaki | 194/207 |
| 6,843,418 | B2 * | 1/2005 | Jones et al. | 235/462.01 |
| 7,040,534 | B2 * | 5/2006 | Turocy et al. | 235/379 |
| 7,349,075 | B2 * | 3/2008 | Fujimoto et al. | 356/71 |
| 7,362,423 | B2 * | 4/2008 | Masten | 356/71 |
| 7,586,592 | B2 * | 9/2009 | Itako et al. | 356/71 |
| 8,260,027 | B2 * | 9/2012 | Nireki | 382/135 |
| 2009/0087076 | A1 * | 4/2009 | Jenrick et al. | 382/135 |
| 2010/0104170 | A1 * | 4/2010 | Joshi et al. | 382/135 |

FOREIGN PATENT DOCUMENTS

| | | |
|---|---|---|
| JP | 8 161418 | 6/1996 |
| JP | 3320806 | 9/2002 |
| JP | 2005 107765 | 4/2005 |

* cited by examiner

*Primary Examiner* — Anand Bhatnagar
(74) *Attorney, Agent, or Firm* — Lexyoume IP Meister, PLLC.

(57) ABSTRACT

A bill processing apparatus capable of inexpensively performing an authenticity judgment of a bill and a paper sheet on which a bar code is printed is provided. The bill processing apparatus has light emitting parts (80*a*, 81*b*) for irradiating an identification object passing through a traveling route with light; a light receiving part (81*a*) receiving light from the identification object that is irradiated by the light emitting parts (80*a*, 81*b*); a determining part (232) determining whether the identification object is a bill or a paper sheet on which a bar code is printed based on the light received by the light receiving part (81*a*); and a light emission control part controlling the light emission of the light emitting parts (80*a*, 81*b*). The light emission control part changes the lighting interval according to the object determined by the determining part (232).

10 Claims, 19 Drawing Sheets

BANKNOTE PROCESSING DEVICE AND AUTHENTICATION DETERMINING AND PROCESSING METHOD

FIELD OF THE INVENTION

The present invention relates to a bill processing apparatus (or banknote processing device) which is capable of carrying out an authenticity judgment of a paper sheet or the like other than a bill in addition to the authenticity judgment of the bill, and an authenticity judgment processing method (or authentication determining and processing method) employed in such bill processing apparatus.

BACKGROUND ART

In general, a bill processing apparatus is incorporated into a service providing device, such as a game medium rental machine installed in a game hall, a vending machine or a ticket-vending machine installed in a public space, or the like, which identifies the validity of a bill inserted from a bill insertion slot by a user, and provides various types of products and services in accordance with a value of the bill having been judged as valid.

Recently, it is also seen that a paper sheet or the like (it may also be called a coupon ticket) having an equivalent economic value to that of a bill is issued in a game hall and processed by a bill processing apparatus which handles a regular bill. As such a coupon ticket, what has a bar code printed on a paper sheet (thermal paper) formed in the same size as that of a specific bill (typically, United States dollar bill) is known (i.e., a coupon ticket with a bar code) and it is possible for a user to be provided with equivalent services to those by the bill when the issued coupon ticket with the bar code is inserted, in the same manner as the bill, into the insertion slot of the bill processing apparatus which processes the bill.

Meanwhile, in such a way of using the bill processing apparatus, it is necessary for the abovementioned bill processing apparatus to be configured to be capable of judging the authenticity of the bill as well as such a bar-coded paper sheet. As such a bill processing apparatus, for example, Patent Document 1 discloses a configuration that a sensor device for reading a bill or a bar-coded paper sheet inserted into a bill insertion slot is installed in a bill traveling route.

This sensor device has a magnetic sensor 20 and optical sensors 21 to 23 for reading the bill, and optical sensors 24, 25 for reading a bar-code pattern, and, before or after an object to be identified, which has been inserted from a bill insertion slot, is determined to be a bill containing a magnetic pattern or an optical pattern, the sensor device detects the presence or absence of a bar-code such that the authenticity of the detected bar-code pattern is judged. In this apparatus, however, dedicated sensors (the magnetic sensor 20 and the optical sensors 21 to 23) for reading the bill and dedicated sensors (the optical sensors 24, 25) for reading the bar-code are installed such that the number of components is great.

[Patent Reference 1] Japanese patent No. 3320806

DISCLOSURE OF THE INVENTION

Problem To Be Solved By The Invention

Therefore, a bill processing apparatus being capable of performing an authenticity judgment inexpensively is, here, provided for a bill as well as a paper sheet with a bar code, and an authenticity judgment processing method utilized in such a bill processing apparatus is also provided.

Means To Solve The Problem

In the present invention, a bill processing apparatus comprises a light emitting part which irradiates light to an object to be identified (identification object or ID object) passing through a traveling route, a light receiving part which receives the light from the identification object, which is irradiated by the light emitting part, a determining part which determines whether the identification object is a bill or a paper sheet on which a bar code is printed based on the light that is received by the light receiving part, and a light emission control part which controls the light emission of the light emitting part, wherein the light emission control part changes a lighting interval according to the identification object which has been determined by the determining part. Further features of the present invention, its nature, and various advantages will be more apparent from the accompanying drawings and the following description of the preferred embodiment.

BRIEF DESCRIPTION OF THE DRAWINGS

FIG. 6 is a block diagram showing a configuration of control means which controls driving of a bill conveyance mechanism, bill reading means, and the like.

DESCRIPTION OF NOTATIONS

Figure 1:
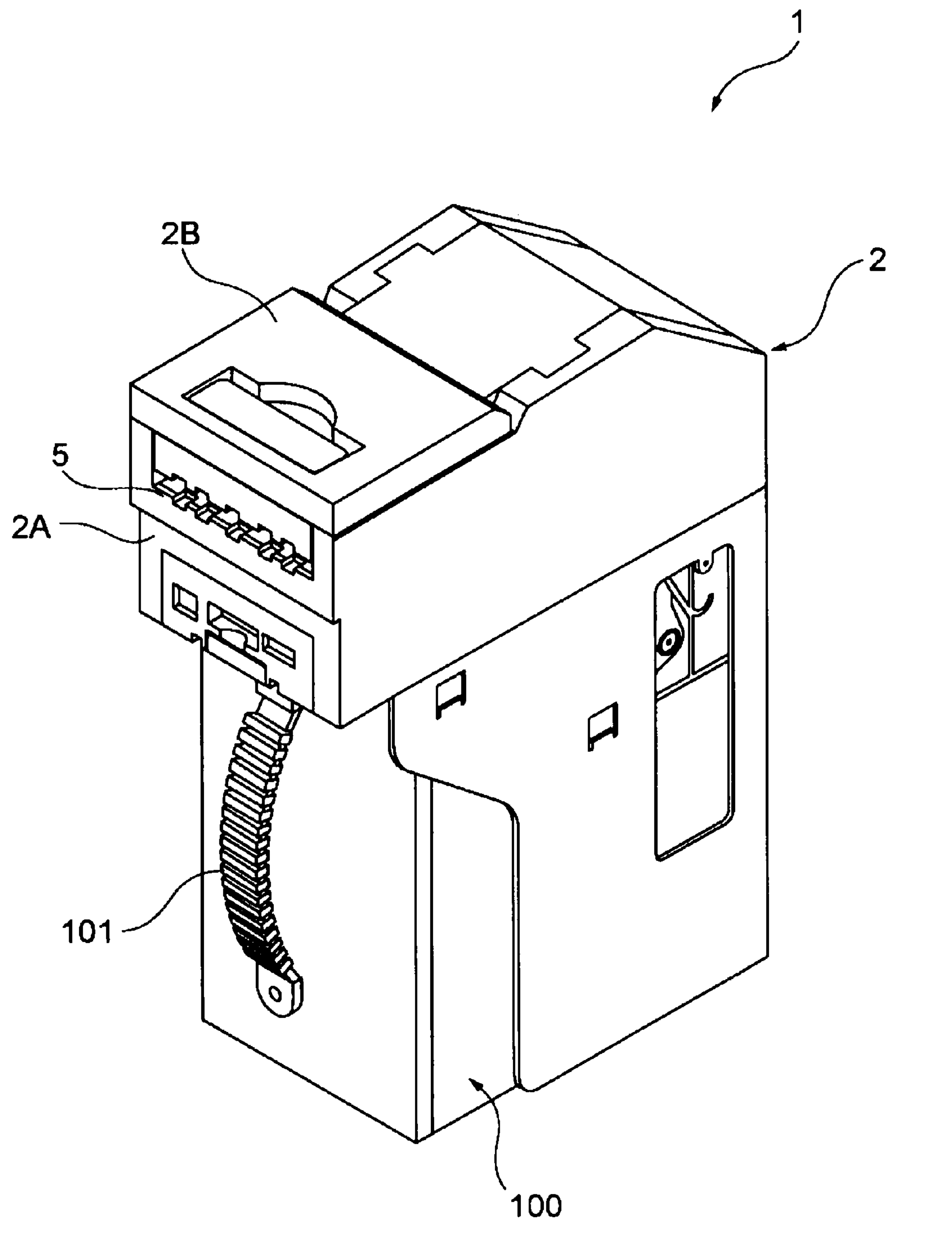
FIG. 1 is a perspective view showing an entire structure to illustrate a configuration of a bill processing apparatus.

1 bill processing apparatus
2 apparatus main body
3 bill traveling route
5 bill insertion slot
6 bill conveyance mechanism
8 bill reading means
10 skew correction mechanism
80 light emitting unit
80*a* first light emitting part
81 light receiving/emitting unit
81*a* light receiving part
81*b* Second light emitting part
88 bar code sensor
100 bill housing part
200 control means

BEST MODE FOR CARRYING OUT THE INVENTION

Hereinafter, an embodiment of the present invention will be described with reference to the drawings.

Figure 2:
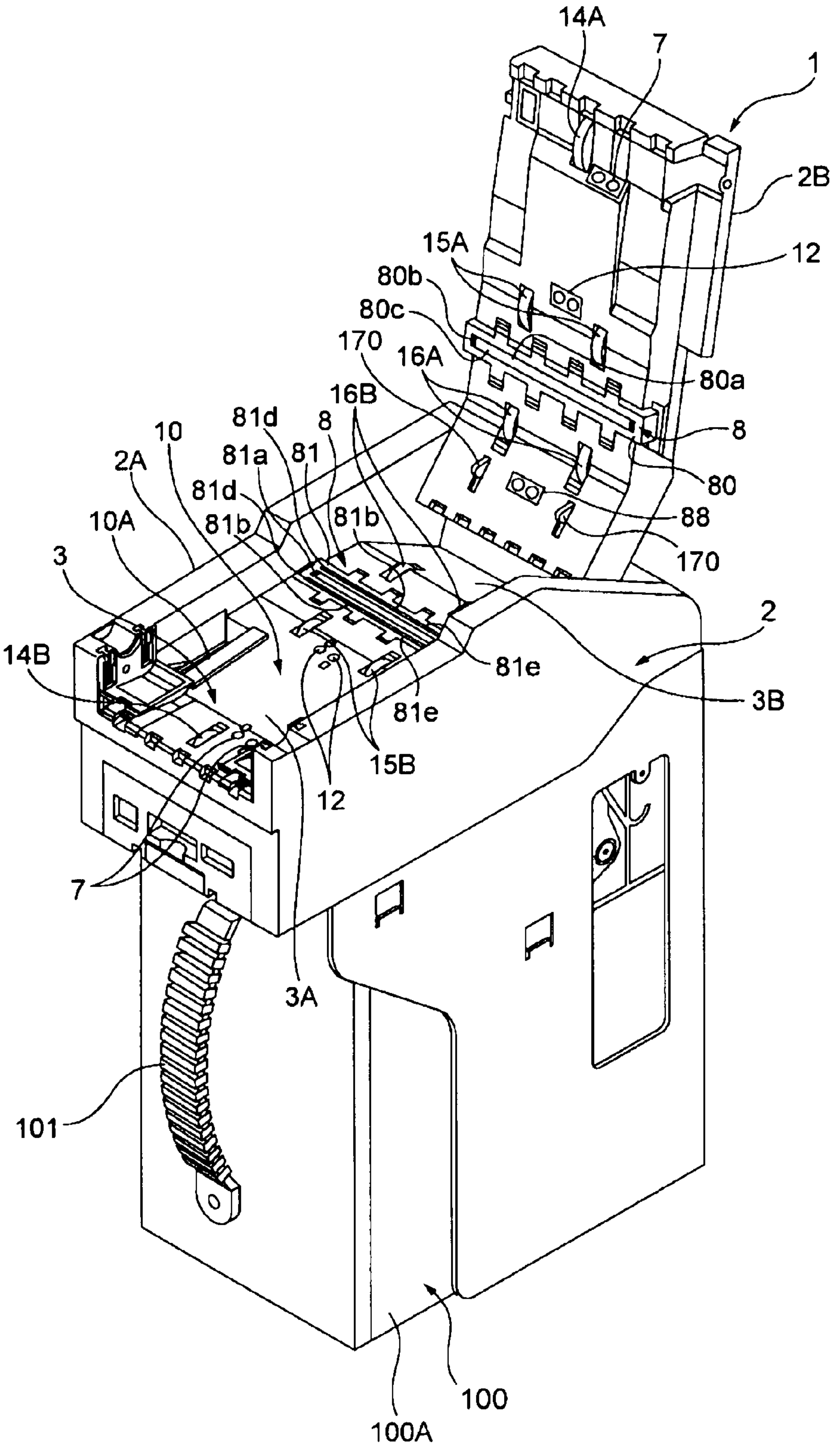
FIG. 2 is a perspective view showing the bill processing apparatus in a state that an open/close member is opened for a main body frame of an apparatus main body.
Figure 3A:
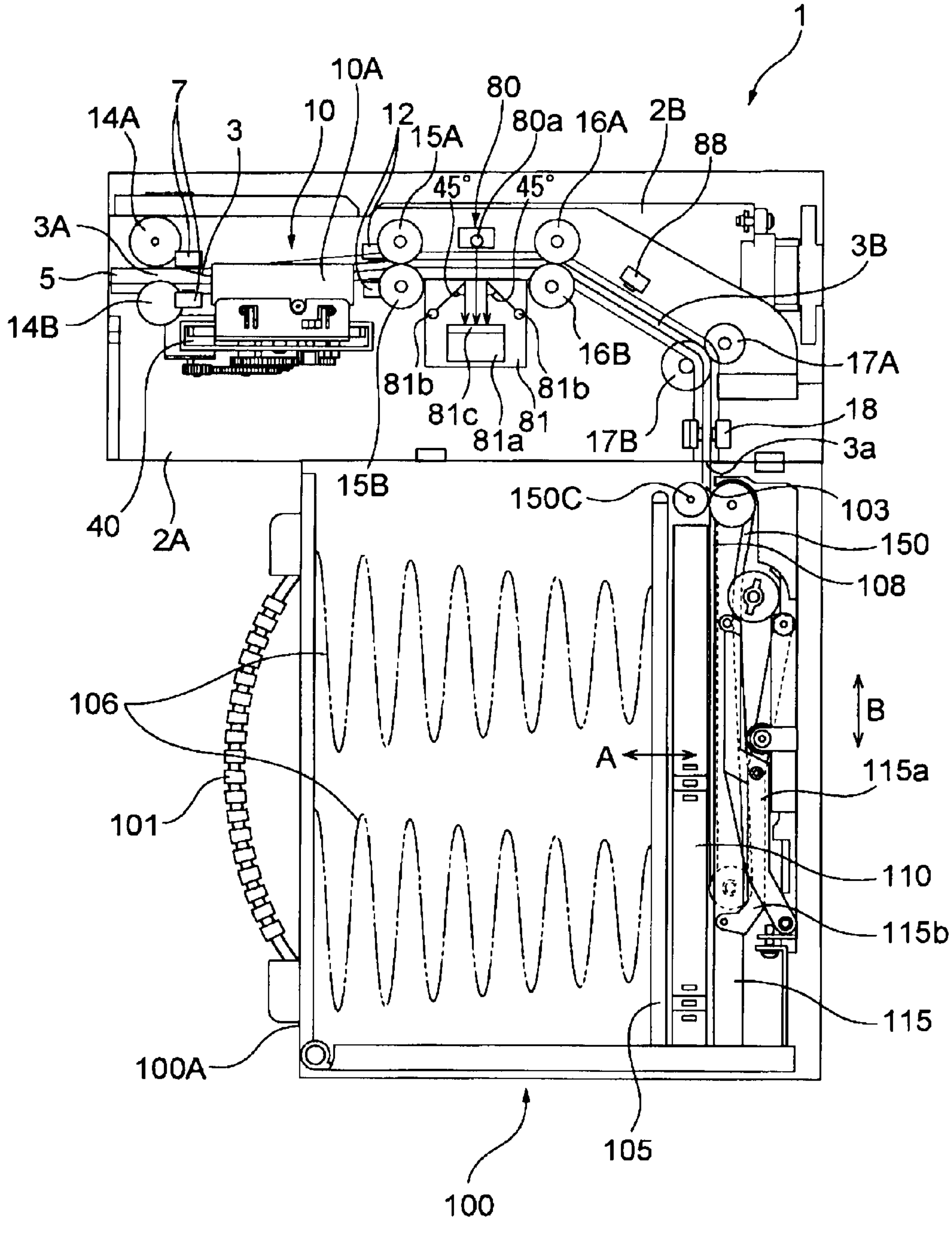
FIG. 3A is a right side view schematically showing a traveling route of a bill to be inserted from an insertion slot.
Figure 3B:
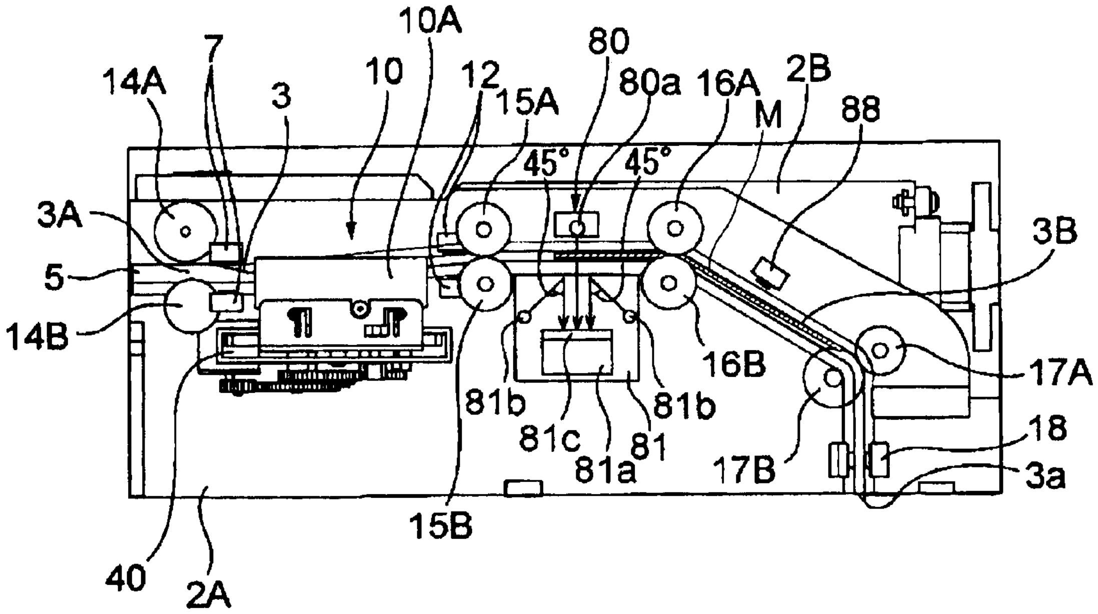
FIG. 3B is a right side view schematically showing how the bill having been inserted from the insertion slot passes through the traveling route.
Figure 4:
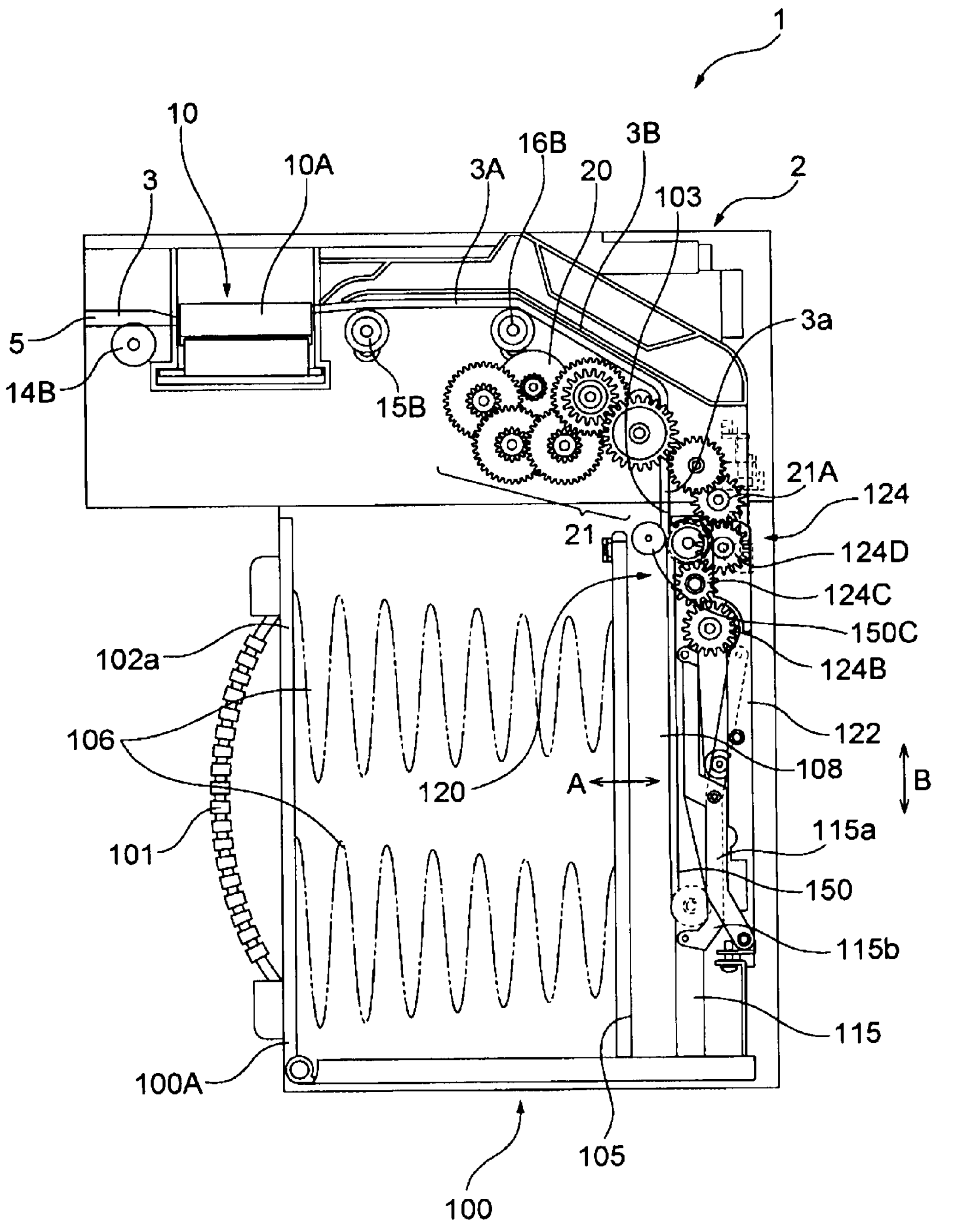
FIG. 4 is a right side view showing a schematic configuration of a driving force transmission for driving the presser plate arranged in a bill housing part.
Figure 5:
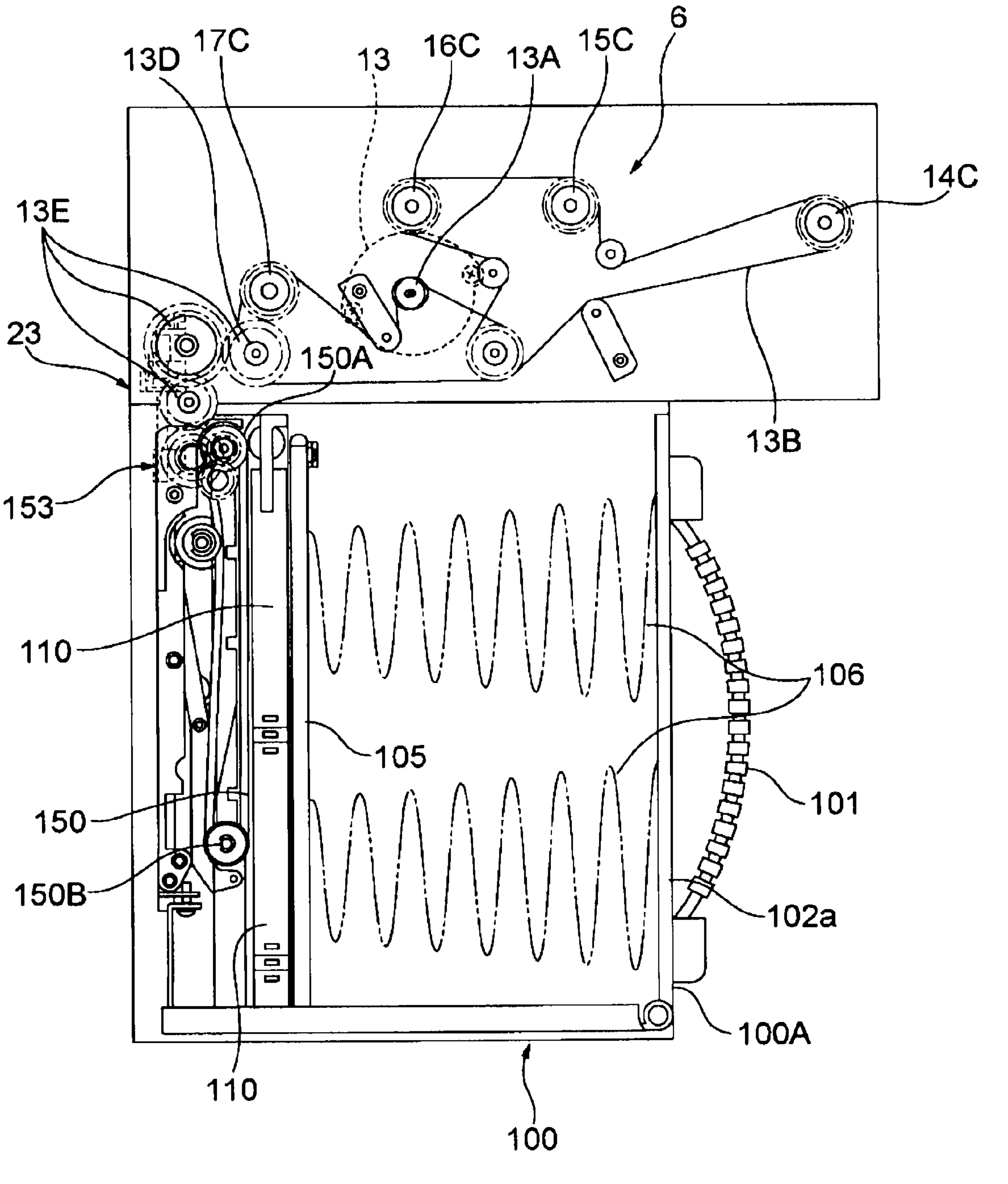
FIG. 5 is a left side view showing a schematic configuration of a driving source and a driving force transmission mechanism to drive a bill conveyance mechanism.

FIGS. 1 to 5 are diagrams showing a configuration of a bill processing apparatus according to the present embodiment. FIG. 1 is a perspective view showing a general configuration thereof; FIG. 2 is a perspective view showing a state that an open/close member is opened for a main body frame of an apparatus main body, FIGS. 3A and 3B are right side views showing schematically a traveling route for a bill inserted from an insertion slot; FIG. 4 is a right side view showing schematically a driving force transmission mechanism for driving a presser plate installed in a bill housing part; and FIG. 5 is a left side view showing a schematic configuration of a driving source and the driving force transmission mechanism to drive a bill conveyance mechanism.

A bill processing apparatus 1 of this embodiment is so configured that it can be incorporated into, for example, various types of gaming machines such as a slot machine and the like, and the bill processing apparatus 1 includes an apparatus main body 2 and a housing part (e.g., stacker or cashbox) 100 which is provided to the apparatus main body 2 and is capable of stacking and housing a great number of bills. Here, the housing part 100 may be mountable to and demountable from the apparatus main body 2, and it is possible, for example, to remove from the apparatus main body 2 by pulling a handle 101 provided on the front face thereof in a state that a lock mechanism (not shown) is unlocked.

Figure 16A:
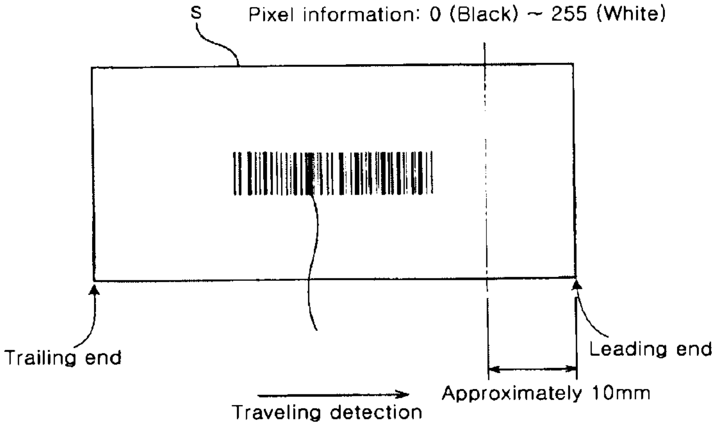
FIG. 16A is a schematic diagram showing a read-out processing of the paper sheet having the bar code printed thereon.

The bill processing apparatus 1 in the present invention is configured to process, not only a bill, but also a paper sheet on which a bar code is printed so that the paper sheet may have an equivalent value to that of the bill. Such paper sheet on which the bar code is printed is made as a dedicated printer prints the bar code containing various types of information such as value information (information corresponding to the face value of the bill), issued date information, issued location information, and the like on a piece of paper formed in the same size as the bill as shown in FIG. 16A, and the bill processing apparatus 1 is configured to judge the authenticity of the bill as well as the authenticity of such paper sheet on which the bar code is printed with bill reading means to be described later. That is, the bill processing apparatus 1 is configured to be capable of handling the paper sheet on which a dedicated bar-code is printed as well the bill.

As shown in FIG. 2, the apparatus main body 2 has a main frame body 2A and an open/close member 2B being configured to be opened and closed for the main body frame 2A by rotating around an axis positioned at one end thereof as a rotating center. Then, as shown in FIG. 3A, the frame 2A and the open/close member 2B are configured to form a space (bill traveling route 3) through which a bill is conveyed such that both face each other across the space when the open/close member 2B is closed for the main body frame 2A, and to form a bill insertion slot 5 such that front exposed faces of both are aligned and that the bill traveling route 3 exits at the bill insertion slot 5. In addition, the bill insertion slot 5 is a slit-like opening from which a short side of a bill can be inserted into the inside of the apparatus main body 2.

Also, in the apparatus main body 2, a bill conveyance mechanism 6 that conveys a bill along a bill traveling route 3; an insertion detecting sensor 7 that detects the bill inserted into the bill insertion slot 5; bill reading means (first sensor) 8 that is installed on a downstream side of the insertion detecting sensor 7 and reads out information on the bill in a traveling sate; a skew correction mechanism 10 that accurately positions and conveys the bill with respect to the bill reading means 8; a movable piece passage detecting sensor 12 that detects that the bill passes through a pair of movable pieces constituting the skew correction mechanism; a bar code sensor (second sensor) 88 that is capable of reading out a bar code on the bill having been inserted as a printed face thereof is on a top face side when the bar code on the bill cannot be read out by the bill reading means 8; and a discharge detecting sensor 18 that detects that the bill is discharged into a bill housing part 100 are provided.

Hereafter, the respective components described above will be described in detail. The bill traveling route 3 extends from the bill insertion slot 5 toward the inside, and comprises a first traveling route 3A and a second traveling route 3B extending from the first traveling route 3A toward the downstream side and being inclined downwardly at a predetermined angle to the first traveling route 3A. The second traveling route 3B is bent in a vertical direction on the downstream side and a discharge slot 3*a* from which the bill is discharged into the bill housing part 100 is formed at an end portion on the downstream side such that the bill discharged from the discharge slot 3*a* is fed into a feed port (receiving port) 103 of the bill housing part 100 in the vertical direction.

The bill conveyance mechanism 6 is a mechanism capable of conveying the bill inserted from the bill insertion slot 5 along the insertion direction, and of conveying back the bill in an insertion state toward the bill insertion slot 5. The bill conveyance mechanism 6 comprises a motor 13 (refer to FIG. 5) serving as a driving source installed in the apparatus main body 2; and conveyor roller pairs (14A and 14B), (15A and 15B), (16A and 16B), and (17A and 17B) which are installed at predetermined intervals along the bill traveling direction in the bill traveling route 3, and are driven to rotate by the motor 13.

The conveyor roller pairs are installed so as to be partially exposed on the bill traveling route 3, and all the pairs are constituted of driving rollers of the conveyor rollers 14B, 15B, 16B, and 17B installed on the underside of the bill traveling route 3 driven by the motor 13; and pinch-rollers of the conveyor rollers 14A, 15A, 16A, and 17A installed on the upperside and driven by the these driving rollers. In addition, the conveyor roller pair (14A and 14B) to first nip and hold therebetween the bill inserted from the bill insertion slot 5, and to convey the bill toward the back side, as shown in FIG. 2, is installed in one portion of the center position of the bill traveling route 3, and a couple of the conveyor roller pairs (15A and 15B), (16A and 16B), or (17A and 17B) being disposed in this order on the downstream side thereof are respectively installed in a couple of portions with a predetermined interval in the lateral direction of the bill traveling route 3.

Further, the conveyor roller pair (14A and 14B) disposed in the vicinity of the bill insertion slot 5 is usually in a state that the upper conveyor roller 14A is spaced from the lower conveyor roller 14B, and the upper conveyor roller 14A is driven to move toward the lower conveyor roller 14B to nip and hold the inserted bill therebetween when insertion of the bill is sensed by the insertion detecting sensor 7.

Thus, the upper conveyor roller 14A is controllably driven to be pressed against or spaced from the lower conveyor roller 14B by a motor 70 (refer to FIG. 6) for an up-and-down movement of the roller as a driving source. In this case, when a process (skew correction process) for positioning the bill with respect to the bill reading means 8 by eliminating inclination of the inserted bill is executed by the skew correction mechanism 10, the upper conveyor roller 14A is spaced from the lower conveyor roller 14B so as to release the load on the bill, and when the skew correction process is completed, the upper conveyor roller 14A is driven to move toward the lower conveyor roller 14B again to hold (or nip) the bill therebetween. Here, the driving source may be constituted of a solenoid or the like instead of a motor.

Further, the skew correction mechanism 10 comprises a pair of right and left movable pieces 10A (only one side is shown) such that the pair of right and left movable pieces 10A are moved to get closer with each other by driving a motor 40 for a skew driving mechanism, whereby the skew correction process is performed for the bill.

The conveyor rollers 14B, 15B, 16B and 17B installed on the underside of the bill traveling route 3 are, as shown in FIG. 5, driven to rotate via the motor 13 and pulleys 14C, 15C, 16C, and 17C installed at the ends of the driving shafts of the respective conveyor rollers. That is, a driving pulley 13A is installed on the output shaft of the motor 13, and a driving belt 13B is wrapped around between the pulleys 14C, 15C, 16C, and 17C installed at the ends of the driving shafts of the respective conveyor rollers and the driving pulley 13A. In addition, tension pulleys are engaged in places with the driving belt 13B, which prevents the driving belt 13B from loosening.

In accordance with the configuration described above, when the motor 13 is driven to normally rotate, the conveyor rollers 14B, 15B, 16B, and 17B are driven to normally rotate in synchronization therewith to convey the bill toward the insertion direction. When the motor 13 is driven to reversely rotate, the conveyor rollers 14B, 15B, 16B, and 17B are driven to reversely rotate in synchronization therewith to convey back the bill toward the bill insertion slot 5 side.

The insertion detecting sensor 7 is to generate a detection signal when a bill inserted into the bill insertion slot 5 is detected. And when the detection signal is generated, the motor 13 is driven in a normal direction and the bill is conveyed in the insertion direction. The insertion detecting sensor 7 of this embodiment is installed between the pair of conveyor rollers (14A and 14B) and the skew correction mechanism 10 and comprises, for example, an optical sensor such as a regressive reflection type photo sensor. However, the insertion detecting sensor 7 may comprise a mechanical sensor other than the optical sensor.

Further, the movable piece passage detecting sensor 12 is to generate a sensed signal when it is sensed that a front end of the bill passes through a pair of right and left movable pieces 10A constituting the skew correction mechanism 10, and when the detection signal is generated, the driving by the motor 13 is stopped such that the skew correction is made. The movable piece passage detecting sensor 12 of this embodiment is disposed on the upstream side from the bill reading means 8 and also comprises an optical sensor or a mechanical sensor in the same way as mentioned before with respect to the insertion detecting sensor.

Further, the discharge detecting sensor 18 is to detect a back end of the bill passing through such that it is detected that the bill is discharged into the bill housing part 100. The discharge detecting sensor 18 is disposed just in front of the receiving port 103 of the bill housing part 100 on the downstream side of the second traveling route 3B. When the detection signal is transmitted from the discharge detecting sensor 18, the driving by the motor 13 is stopped and the conveyance processing of the bill is terminated. The discharge detecting sensor 18 also comprises an optical sensor or a mechanical sensor in the same way as the aforementioned insertion detecting sensor.

The bill reading means (first sensor) 8 reads bill information (bar code information) on the bill (paper sheet on which a bar code is printed) conveyed in a state that the skew is eliminated by the skew correction mechanism 10, and determines the validity (authenticity). In this embodiment, the bill reading means 8, which is installed in the first traveling route 3A, comprises a line sensor which irradiates the bill (paper sheet on which a bar code is printed) being conveyed from top and bottom sides thereof with light such that transmitted light and reflected light thereof are detected by a light receiving element so as to perform reading.

The bill authenticity identification process according to this embodiment is performed by letting light emitting means irradiate light having a predetermined wavelength to a printed area on a surface of the bill being conveyed, acquiring transmitted-light data of the light transmitted through the bill and reflected-light data of the light reflected by the bill, and comparing such data with the reference data of the legitimate bill having stored in advance such that the identification accuracy may be improved.

In this case, since the legitimate bill has some area from which different image data are acquired depending on the wavelengths of the lights (for example, visible light or infrared light) irradiated to the area, in this embodiment, a plurality of light sources, in consideration of this view point, irradiate different lights of different wavelengths (in this embodiment, a red light and an infrared light are irradiated) to the bill and a transmitted light therethrough and a reflected light thereon are detected such that the authenticity identification accuracy may be improved. That is, since the red light and the infrared light have different wavelengths, transmitted-light data and reflected-light data from a plurality of lights of different wavelengths may be utilized for the bill authenticity judgment whereby the judgment may use the nature that the transmittance of the transmitted light transmitted through the specific area and the reflectance of the reflected light reflected on the specific area in the legitimate bill are different from those of the counterfeit bill. Therefore, an attempt is made to further improve the bill authenticity identification accuracy by employing light sources where a plurality of wavelengths are available.

Here, a concrete bill authenticity identification method will not be written in detail since it is possible to acquire various kinds of received-light data (transmitted-light data and reflected-light data) depending on the wavelengths of the irradiated lights to the bill and the irradiated areas of the bill. However, for example, in a watermarked area of the bill, if an image on the area is viewed with lights of different wavelengths, the image appears greatly different depending on the lights. Therefore, it can be considered that the bill to become an identification object is identified as the legitimate bill or the counterfeit bill by setting this portion as the specified area, acquiring transmitted-light data and reflected-light data from the specified area, and comparing such data with legitimate data from the same specified area of the legitimate bill having been stored in advance in storage means (ROM). At this time, provided that specified areas are predetermined according to the kind of the bill, predetermined weighting may be applied to the transmitted-light data and the reflected-light data from this specified area, thereby enabling improvement of the authenticity identification accuracy.

Then, since the bill reading means 8 is, to be described later, configured to perform the lighting control of the light emitting part with a predetermined interval and to comprise the line sensor which detects the transmitted light and the reflected light as the bill passes through, it is possible to acquire the image data based on the pixel in a predetermined size as a unit by the line sensor. In this case, the image data acquired by the line sensor is converted into data containing color information having brightness for each pixel by a converter which will be described later. In addition, the color information of each pixel having brightness to be converted by the converter corresponds to a contrasting density value, i.e., a density value (a luminance value), and a numerical value from 0 to 255 (0: black to 255: white) is allocated to each pixel as information of one byte according to its density value. Therefore, the predetermined area of the bill is extracted, and pixel information (a density value) contained in the area and pixel information on the same area of the legitimate bill are used so as to be substituted into an appropriate correlating equation, then a coefficient of correlation is obtained by carrying out an operation thereof, thereby enabling the authenticity identification judgment by the coefficient.

Or, in addition to the above description, analog waveforms, for example, are generated from the transmitted-light data and the reflected-light data, and the respective shapes of those waveforms are compared with each other, thereby enabling the authenticity identification judgment by such comparison.

As described above, the bill processing apparatus 1 in the present invention is configured to process, not only the bill, but also the paper sheet on which the bar code is printed. In this case, in identifying the authenticity, the reading characteristics of the bill reading means 8 are different in the case of the bill and in the case of the paper sheet on which the bar code is printed.

For example, with respect to the resolution of an image to be acquired, in consideration of the resolution required for reading the bill and the resolution required for reading the printed bar code, it is required that the resolution for the bar code is higher if compared that of the bill since the line width of the bar code is narrow. In other words, a thin line width of the bar code may not be clearly identified with the resolution suitable for reading the bill while a load in reading the bill may be too large with the resolution suitable for reading the bar code such that the processing speed may be lowered.

Meanwhile, it is possible to improve the resolution of the image to be acquired by the light receiving element by shortening the lighting interval of light irradiated to the identification object. Therefore, in this embodiment, the respective resolutions are varied by changing the lighting intervals of the light emitted from the light emitting part in the case of reading the bill and in the case of reading the paper sheet on which the bar code is printed.

Further, a paper sheet on which a bar code is printed has the feature that infrared light is so absorbed as to be not reflected on the bar code when the bar code is irradiated with the infrared light, and on the other hand, red light is reflected on it. In this embodiment, as described above, in view of a condition that the plurality of light sources irradiating an object with lights of different wavelengths are installed, a light source suitable for the bar code identification is selected from among the plurality of light sources in order to improve the bill authenticity identification accuracy, and unnecessary light sources are controlled to be turned off.

Here, the configuration of the reading means 8 will be described in detail with reference to FIGS. 2 and 3A.

The abovementioned bill reading means 8 has a light emitting unit 80 which is installed on the side of the open/close member 2B and provided with a first light emitting part 80*a* capable of irradiating the upper side of the bill to be conveyed with the infrared light and the red light, and a light receiving/emitting unit 81 which is installed on the side of the main body frame 2A.

The light receiving/emitting unit 81 has a light receiving part 81*a* which is provided with a light receiving sensor facing the first light emitting part 80*a* across the bill (paper sheet) and second light receiving parts 81*b* which are installed adjacently on the both sides of the light receiving part 81*a* along the bill traveling direction and are capable of irradiating the object with the infrared light and the red light.

The first light emitting part 80*a* disposed to face the light receiving part 81*a* works as a light source for the transmissive light. This first light emitting part 80*a* is, as shown in FIG. 2, comprised of a rectangular bar-like body made of synthetic resin which emits the light guided through a light guiding body 80*c* provided inside from an LED element 80*b* fixed to one end of the bar-like body. The first light emitting part having such a configuration is linearly installed in parallel with the light receiving part 81*a* (light receiving sensor) so as to be capable of entirely and equally irradiating the entire range in the width direction of the traveling route of the bill to be conveyed although the configuration is simple.

The light receiving part 81*a* of the light receiving/emitting unit 81 is formed in a thin-walled plate shape having a band shape extending in a lateral direction of the bill traveling route 3 and having a width to an extent that the sensitivity of the light receiving sensor (not shown) provided in the light receiving part 81*a* is not affected. In addition, the light receiving sensor is configured as a so-called line sensor in which a plurality of CCDs (Charge Coupled Devices) are provided linearly in the center in the thickness direction of the light receiving part 81*a*, and a GRIN lens array 81*c* is disposed linearly above these CCDs so as to collect the transmitted light and athe reflected light. Therefore, it is possible to receive the transmitted light or the reflected light of the infrared light or the red light emitted from the first light emitting part 80*a* or the second light emitting parts 81*b* such that the bill serving as the object for authenticity judgment is irradiated with the infrared light or the red light, and generate contrasting density data according to its luminance (pixel data containing information of brightness) as the received-light data and a two-dimensional image on the basis of the contrasting density data.

The second light emitting part 80*b* of the light receiving/emitting unit 81 works as a light source for the reflection light. This second light emitting part 81*b* is, in a similar manner as the first emitting part 80*a*, comprised of a rectangular bar-like body made of synthetic resin which emits the light guided through a light guiding body 81*e* provided inside from an LED element 81*d* fixed to one end of the bar-like body. The second light emitting part 81*b* is also configured to be linearly installed in parallel with the light receiving part 81*a* (line sensor).

The second light emitting parts 81*b* are capable of irradiating the bill with the light at an elevation angle of 45 degrees, for example, and are so installed that the light receiving part 81*a* may receive the reflected light from the bill. In this case, the lights irradiated to the bill by the second light emitting parts 81*b* are to be made incident at 45 degrees onto the light receiving part 81*a*, but the incident angle is not limited to 45 degrees such that the arrangement may be re-arranged as appropriate as long as the lights are irradiated evenly without shading to the surface of the bill. Therefore, the arrangement of the second light emitting parts 81*b* and the light receiving part 81*a* may be appropriately changed in design in accordance with the structure of the bill processing apparatus. Further, the second light emitting parts 81*b* are disposed on the both sides of the light receiving part 81*a* so as to be disposed across it and irradiate the respective lights at respective incident angles of 45 degrees to the bill. This is because, in the case where the surface of the bill has scratches or folded wrinkles, and in the case where the light is irradiated only from one side to an uneven surface generated by these scratches or folded wrinkles, it is unavoidable to make some portions shaded to cause shadow in the uneven surface. Therefore, it is prevented that the shadow is made in the portion of the uneven surface by irradiating the bill with the lights from the both sides, whereby the image data to be acquired can have a higher degree of accuracy than that of the single side irradiation. However, the second light emitting part 81*b* may be installed only on one side to configure the apparatus.

In addition, the configuration, the arrangement, and the like of the light emitting unit 80 and the light receiving/emitting unit 81 as described above are not limited to those described in this embodiment, and may be modified as appropriate.

Further, the bar code sensor (second sensor) 88 is installed in the second traveling route 3B formed to be bent to the first traveling route 3A, and more specifically is disposed between the conveyor roller pair (16A and 16B) and the conveyor roller pair (17A and 17B), and is constituted of an optical type of reflective photo sensor. This bar code sensor 88 is, as shown in FIGS. 2 and 3A, installed on the upper side in the second traveling route 3B, and is configured to irradiate the bill or the paper sheet to be conveyed with the light from the upper surface side.

This bar code sensor (second sensor) 88 has, as described above, a function of reading the bar code when the bar code on the paper sheet to be conveyed cannot be read out by the bill reading means (first sensor) 8 (for the bar code of the paper sheet inserted as a printed surface thereof is set on the upper side). Further, the bar code sensor 88 may also have other functions than that of reading the bar code. For example, as will be described later, a function of monitoring a movement of the bill waiting in an escrow position or the paper sheet on which the bar code is printed may be provided thereto in addition to the above function.

The bill housing part 100 which houses the above-described bill and the like is so configured as to stack and house sequentially bills (including paper sheets on which bar codes are printed) identified as being genuine by the bill reading means 8.

As shown in FIGS. 3A to 5, the main body frame 100A constituting the bill housing part 100 is formed into a substantially rectangular parallelepiped (or cuboid) shape, and one end of bias means (e.g., bias spring) 106 is attached to an interior side of a front wall 102*a* thereof, and a placing plate 105 on which bills to be fed via the above-described receiving port 103 are sequentially stacked is provided to the other end thereof. Therefore, the placing plate 105 is in a state that it is pressed toward the presser plate 115, which will be described later, by the bias means 106. In the main body frame 100A, a press standby part 108 that keeps a dropping bill as it falls is provided so as to continuously communicate with the receiving port 103. A pair of regulatory members 110 are disposed on both sides of the press standby part 108, respectively, the regulatory members 110 extending in a vertical direction. An opening is formed between the pair of regulatory members 110 such that the presser plate 115 passes through the opening as bills are successively stacked onto the placing plate 105.

Further, protruding walls are formed on both side walls inside the main body frame 100A such that the placing plate 105 may hit and contact thereon when the placing plate is pressed by the biasing means 106. When the placing plate is biased back by the biasing means 106 after bills are sequentially stacked on the placing plate 105, the protruding walls take a holding role to stably hold the stacked bills by hitting and contacting both sides of a surface of an uppermost bill M1 of the stacked bills.

Further, the presser plate 115 that presses toward the placing plate 105 a bill falling into the press standby part 108 from the receiving port 103 is installed in the main body frame 100A. The presser plate 115 is formed in such a size that it may be capable of reciprocating through an opening formed between the pair of regulatory members 110, and gets into the opening so as to be driven to reciprocate between a position where the bills are pressed against the placing plate 105 (a pressing position) and another position where the press standby part 108 is opened (an initial position). In this case, the bill passes through the opening as being flexibly bent in a pressing operation of the presser plate 115 and is then placed on the placing plate 105.

The presser plate 115 is driven to reciprocate as described above via a presser plate driving mechanism 120 installed in the main body frame 100A. The presser plate driving mechanism 120 comprises a pair of link members 115*a* and 115*b* having respective ends thereof supported pivotally by the presser plate 115 so as to allow the presser plate 115 to reciprocate in an arrow A direction in FIGS. 3A and 4, and these link members 115*a* and 115*b* are connected in a shape of letter "X", and the other ends opposite to the respective ends are supported pivotally by a movable member 122 installed movably in a vertical direction (an arrow B direction). A rack is formed in the movable member 122, and a pinion constituting the presser plate driving mechanism 120 is geared (engaged) with the rack.

As shown in FIG. 4, a housing part side gear train 124 constituting the presser plate driving mechanism 120 is connected to the pinion. For this case, as shown in FIG. 4, in this embodiment, a driving source (a motor 20) and a main body side gear train 21 sequentially engaged with the motor 20 are installed in the above-described apparatus main body 2, and when the bill housing part 100 is mounted to the apparatus main body 2, the main body side gear train 21 is to be connected to the housing part side gear train 124. That is, the housing part side gear train 124 comprises a gear 124B installed on the same axis of the pinion and gears 124C, 124D to be engaged sequentially with the gear 124B, and when the bill housing part 100 is mounted to and demounted from the apparatus main body 2, the gear 124D is configured to be engaged with and disengaged from a final gear 21A of the main body side train 21.

As a result therefrom, the presser plate 115 is driven to reciprocate in the arrow A direction as the motor 20 installed in the apparatus main body 2 is driven to rotate so as to drive the main body side train 21 and in turn the presser plate driving mechanism 120 (the housing part side gear train 124, the rack installed onto the movable member 122, and the link members 115*a*, 115*b*, etc.).

Conveyor members 150 which are capable of touching the bill conveyed-in from the receiving port 103 are installed in the main body frame 100A. The conveyor members 150 take their own role to contact the bill conveyed-in so as to stably guide the bill to an appropriate position in the press standby part 108 (position where the bill can be stably pressed without causing the bill to be moved to the right or left side when the bill is pressed by the presser plate 115). In this embodiment, the conveyor members are constituted of belt-like members (hereafter called belts 150) installed so as to face the press standby part 108.

In this case, the belts 150 are installed so as to extend along the conveying-in direction with respect to the bill, and are wrapped around the pair of pulleys 150A and 150B supported rotatably on both ends in the conveying-in direction. Further, the belts 150 contact a conveyor roller 150C extending in an axis direction which is supported rotatably in the region of the receiving port 103, and the belts 150 and the conveyor roller 150C nip and hold the bill conveyed-in the receiving port 103 therebetween to guide the bill directly to the press standby part 108. Moreover, in this embodiment, the pair of belts 150 are provided on the right and left sides, respectively, across the above-described presser plate 115 in order to be capable of contacting the surface on left and right sides of the bill. Here, the belts 150 may be prevented from loosening by not only being wrapped around the pulleys 150A and 150B at the both ends, but also causing tension pulleys to push the belts 150 at the intermediate positions, respectively.

The pair of belts 150 are configured to be driven by the motor 13 that drives the above-described plurality of conveyor rollers installed in the apparatus main body 2. In detail, as shown in FIG. 5, the above-described driving belt 13B driven by the motor 13 is wrapped around a pulley 13D for the driving force transmission, and a gear train 153 installed at the end of the spindle of the pulley 150A supported rotatably on the receiving port 103 side is engaged with a gear train 13E for the power transmission sequentially installed onto the pulley 13D. That is, when the bill housing part 100 is mounted to the apparatus main body 2, an input gear of the gear train 153 is configured to be engaged with a final gear of the gear train 13E, and the pair of belts 150 are configured to be driven to rotate in a synchronized manner with the above-described conveyor rollers 14B, 15B 16B, and 17B for conveying the bill by driving the motor 13 to rotate.

As described above, when the bill is inserted into the inside via the bill insertion slot 5, the bill is moved inside the bill traveling route 3 by the bill conveyance mechanism 6. As shown in FIG. 3A, the bill traveling route 3 has the first traveling route 3A which is extended from the bill insertion slot 5 toward the back side, and the second traveling route 3B which is extended from the first traveling route 3A toward the downstream side and is inclined at a predetermined angle to the first traveling route 3A. A shutter member 170 that prevents the bill from being conveyed toward the bill insertion slot 5 by a fraudulent activity is installed in the second traveling route 3B.

Next, control means 200 that controls the driving of the bill conveyance mechanism 6, the bill reading means 8, and the like as mentioned above will be described with reference to a block diagram of FIG. 6.

In an authenticity judging method of the bill according to this embodiment, first, the bill or the paper sheet on which the bar code is printed (hereinafter referred to as "paper sheet or the like" or "identification object") is irradiated with the light (red light) emitted from the second light emitting parts 81*b* in the light receiving/emitting unit 81 as the identification object is conveyed by the bill conveyance mechanism 6; and a reflected light therefrom is received by the light receiving part (line sensor) 81*a* so as to execute reading of the paper sheet or the like. This reading is executed for each pixel in a predetermined size as a unit during the conveying process of the paper sheet or the like, and the image data constituted of a large number of pixels (a plurality of pixels) having been read in this way is stored in storage means such as a RAM. In addition, here, the image data constituted of the plurality of pixels to be stored contain color information having brightness (density value) converted for each pixel by the converter as will be described later, and a numerical value from 0 to 255 (0: black to 255: white) is allocated to each pixel as information of one byte according to its density value.

In this way, by converting an image obtained by the line sensor into pixel information containing color information having brightness (density value) by the converter, it becomes possible to perform the determination of the identification object with the light receiving part and the light emitting part, both of which can be commonly utilized in the bill authenticity judgment for the bill and the paper sheet on which the bar code is printed, whereby the authenticity judgment of the bill and the paper sheet on which the bar code is printed can be performed inexpensively.

Figure 6:
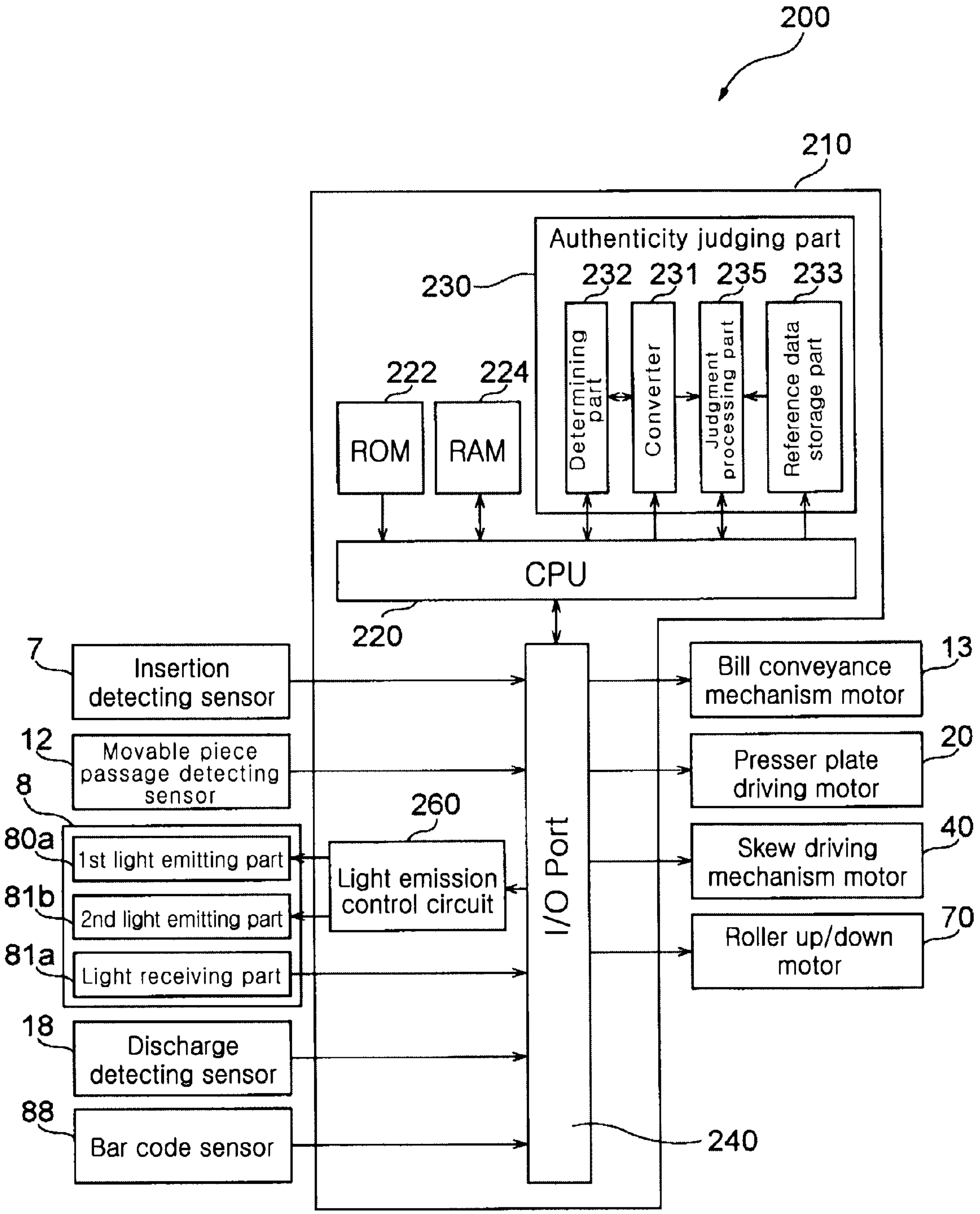
Figure 7:
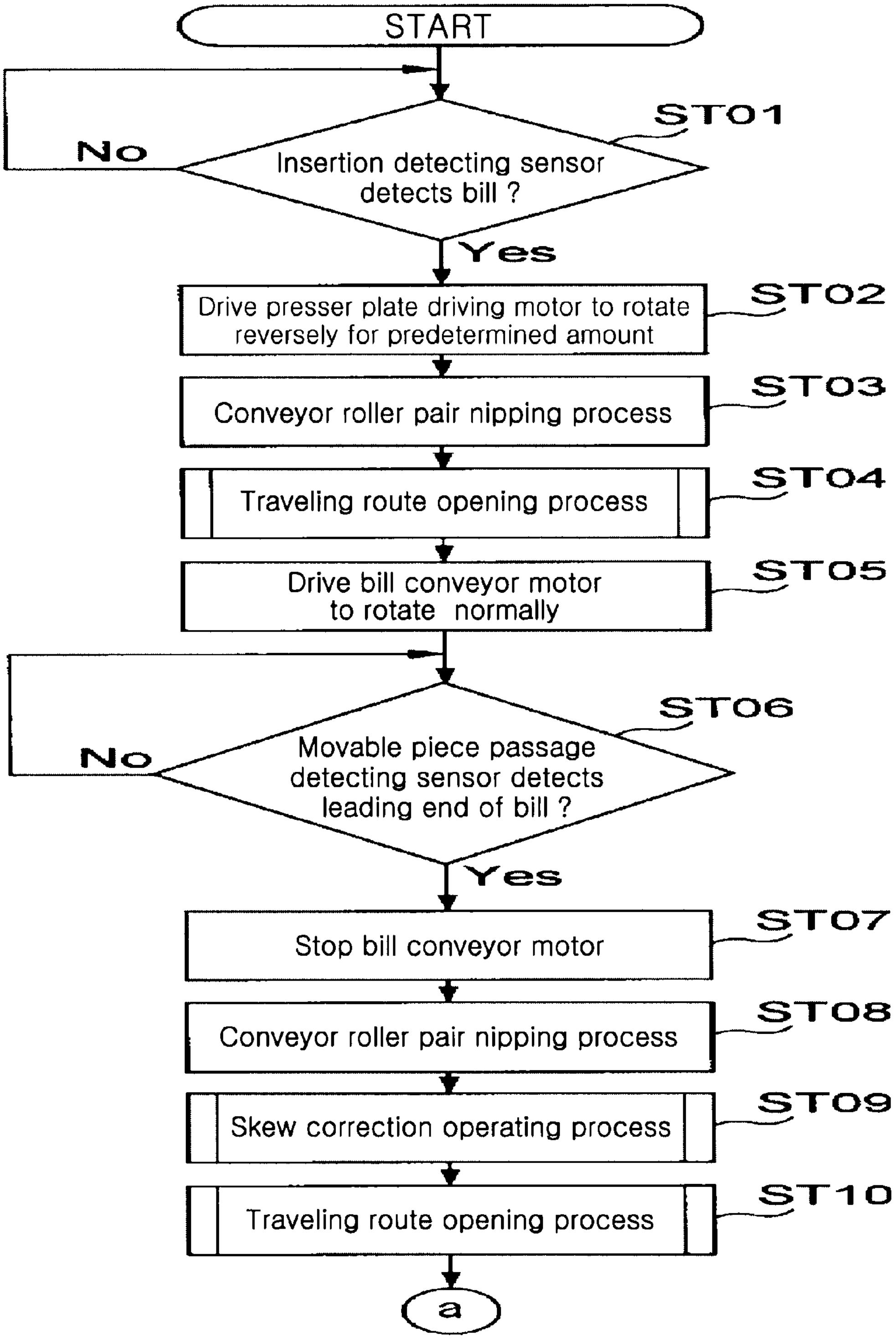
FIG. 7 shows a flowchart (part one) illustrating processing operations for processing a bill in a bill processing apparatus of this embodiment.
Figure 8:
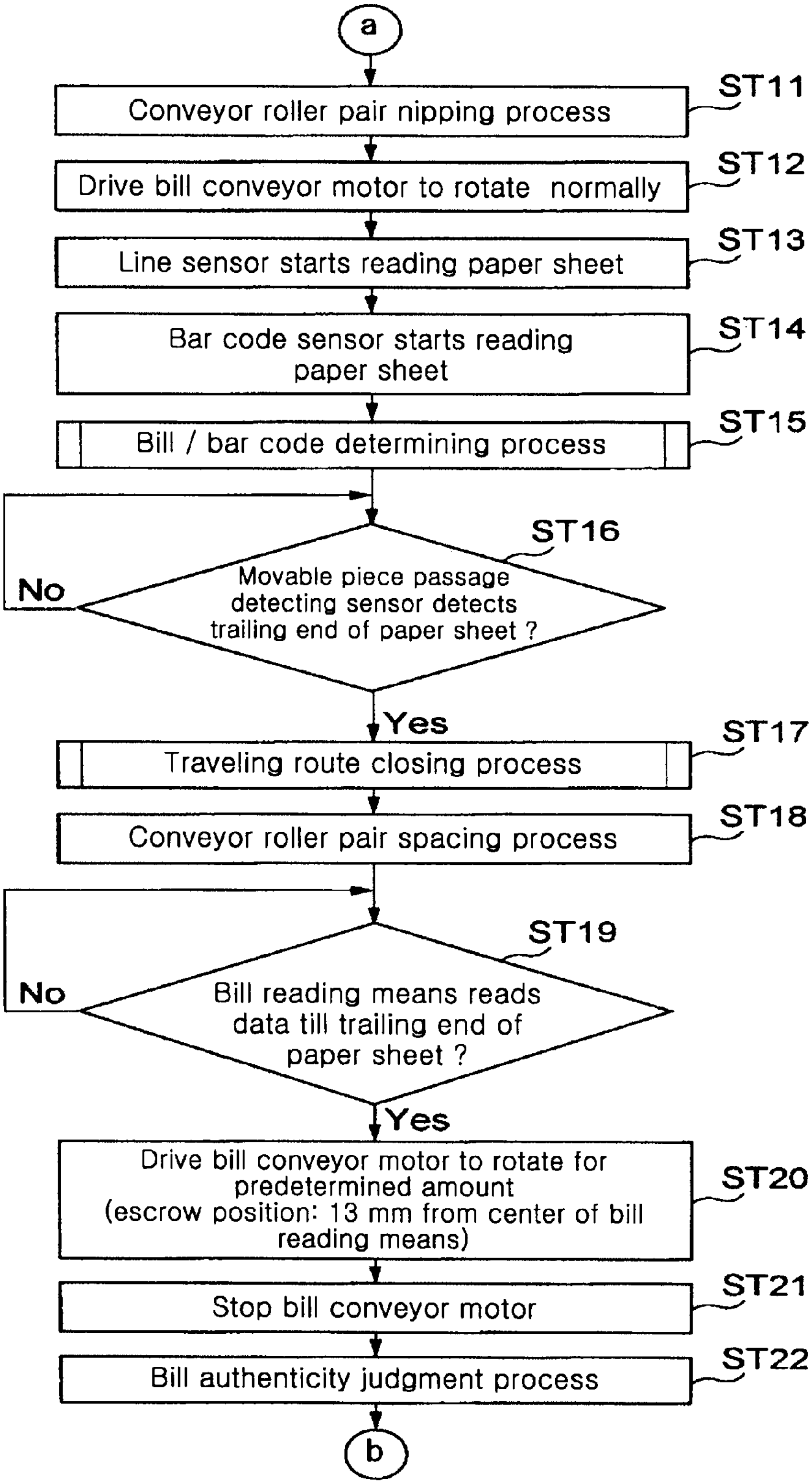
FIG. 8 shows a flowchart (part two) illustrating processing operations for processing a bill in a bill processing apparatus of this embodiment.
Figure 9:
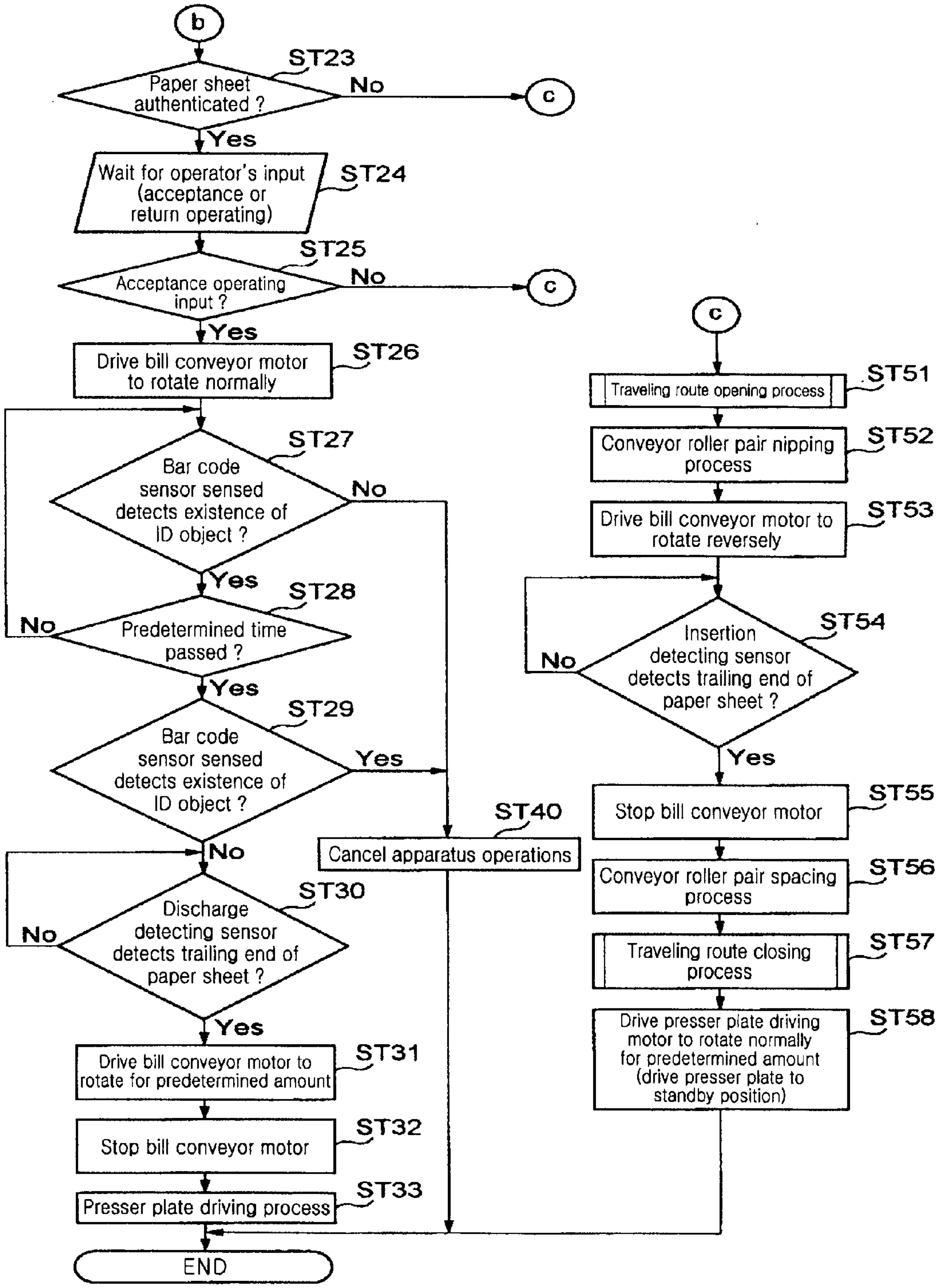
FIG. 9 shows a flowchart (part three) illustrating processing operations for processing a bill in a bill processing apparatus of this embodiment.

The control means 200 as shown in a block diagram of FIG. 6 comprises a control board 210 which controls the operations of the above-described respective drive units, and a CPU (Central Processing Unit) 220 controlling driving of each drive unit and constituting the bill identification means, a ROM (Read Only Memory) 222, a RAM (Random Access Memory) 224, and an authenticity judging part 230 are implemented on the control board 210.

In the ROM 222, permanent data such as various types of programs such as an authenticity judgment program in the authenticity judging part 230, operation programs for the respective drive units such as the motor 13 for the bill conveyance mechanism, the motor 20 for the presser plate, the motor 40 for the skew correction mechanism, and the roller up-and-down motor 70 for lifting up and down rollers, and the like are stored.

The CPU 220 operates according to the programs stored in the ROM 222, and carries out input and output of the signals with respect to the respective drive units described above via an I/O port 240, so as to perform the entire operational control of the bill processing apparatus. That is, the motor 13 for the bill conveyance mechanism, the motor 20 for the presser plate, the motor 40 for the skew correction mechanism, and the roller up-and-down motor 70 are connected to the CPU 220 via the I/O port 240, and the operations of these drive units are controlled by control signals transmitted from the CPU 220 in accordance with the operation programs stored in the ROM 222. Further, the CPU 220 is so configured that detection signals from the insertion detecting sensor 7, the movable piece passage detecting sensor 12, the discharge detecting sensor 18, and the bar code sensor 88 are input into the CPU 220 via the I/O port 240, and the driving of the respective drive units is controlled based on these detection signals. Here, the bar code sensor 88 also has a function to perform an authenticity identification of the bar code when the paper sheet on which the bar code is printed is conveyed with the printed surface face up.

Moreover, the CPU 220 is so configured that a detection signal based on a transmitted light and a reflected light of the light which is irradiated to the identification object is input into the CPU 220 via the I/O port 240 from the light receiving part 81*a* in the bill reading means 8 as described above.

Data and programs used for operating the CPU 220 are temporarily stored in the RAM 224, which has a function to acquire and temporarily store the received light data (image data constituted of a plurality of pixels) of the bill or the paper sheet on which the bar-code is printed serving as the identification object.

The authenticity judging part 230 comprises: a converter 231 which converts the received light data of the identification object stored in the RAM 224 into pixel information containing color information having brightness (density value) for each pixel, a determining part 232 which determines the conveyed identification object as the bill or the paper sheet on which the bar-code is printed based on the pixel information converted by the converter 231, a reference data storage part 233 in which reference data of the bill and the paper sheet are stored, and a judgment processing part 235 which compares the pixel data containing the density values converted by the converter 231 with the reference data stored in the reference data storage part 233 so as to perform the authenticity judgment process.

In this case, the reference data are stored in the dedicated reference data storage part 233 according to this embodiment. However, the data may be stored in the above-described ROM 222. Further, the reference data serving as the reference to be compared may be stored in advance in the reference data storage part 233. However, for example, the received-light data, which is acquired as the legitimate bill is conveyed through the bill conveyance mechanism 6, may be stored in the reference data storage part 233 as the reference data.

Moreover, the CPU 220 is configured to be connected to the first light emitting part 80*a* and the second light emitting part 81*b* in the aforementioned bill reading means 8 via the I/O port 240. The first light emitting part 80*a* and the second light emitting parts 81*b* are controlled through a light emission control circuit 260 by a control signal from the CPU 220 in accordance with the operation programs stored in the abovementioned ROM 222 such that the lighting interval and the turning-off are controlled. That is, the first light emitting part 80*a* and the second light emitting parts 81*b* are controlled by the light emission control part being constituted of the CPU 220, the ROM 222, and the light emission control circuit 260 such that the lighting state and the turning-off are controlled.

In detail, the first light emitting part 80*a* and the second light emitting parts 81*b* irradiate the lights with a predetermined lighting interval (first lighting interval) to the identification object to be conveyed and, when the identification object is determined as the bill by the determining part 232, the lighting process by the first light emitting part 80*a* and the second light emitting parts 81*b* is continued as it is. Further, when the identification object is determined as the paper sheet on which the bar code is printed by the determining part 232, the infrared lights from the first light emitting part 80*a* and the second light emitting parts 81*b* are turned off, and the second light emitting part 81*b* is controlled such that the lighting interval of the red light is shortened (second lighting interval) and the irradiation thereof is continued.

In addition, as described above, it is necessary to identify a minimum width (approximately 0.508 mm) of the line width in reading the bar code, and it is necessary to improve the resolution (to shorten the lighting interval of the red light) as compared with the case of reading the bill. In this embodiment, the resolution is increased by shortening the lighting interval to as low as ¼ (200 dpi) of that (for example, supposed to be 50 dpi) for the resolution necessary for reading the bill such that the bar code may be read out.

Further, the bar-code sensor 88 always executes a reading process for a paper sheet or the like to be inserted.

Next, the bill processing operation in the bill processing apparatus 1 executed by the control means 200 will be described according to the flowcharts of FIGS. 7 to 13.

When an operator inserts a bill or a paper sheet on which a bar code is printed (hereinafter, these are referred to as "a paper sheet or the like") into the bill insertion slot 5, the conveyor roller pair (14A and 14B) installed in the vicinity of the bill insertion slot is in a state that the rollers are spaced from each other in an initial stage (refer to ST18 and ST56 to be described later). Further, with respect to the presser plate 115, the pair of link members 115*a*, 115*b* driving the presser plate 115 are positioned in the press standby part 108, and the pair of link members 115*a*, 115*b* prevent the paper sheet or the like from being conveyed into the press standby part 108 from the receiving port 103. That is, in this state, the presser plate 115 is brought into the opening formed between the pair of regulatory members 110 such that the condition is so made as to prevent the paper sheets or the like stored in the bill housing part from being drawn out through the opening.

Moreover, the pair of movable pieces 10A constituting the skew correction mechanism 10 located on the downstream side of the conveyor roller pair (14A, 14B) are in a state that the pair of movable pieces 10A are moved to leave the minimum open width therebetween (for example, an interval between the pair of movable pieces 10A is 52 mm; refer to ST17 and ST57 to be described later) so as to prevent the paper sheet or the like from being drawn out in the initial stage.

In the initial state of the above-described pair of conveyor rollers (14A and 14B), it is possible for the operator to easily insert even a paper sheet or the like having wrinkles. Then, when insertion of the paper sheet or the like is detected by the insertion detecting sensor 7 (ST01), the driving motor 20 of the above-described presser plate 115 is driven to rotate reversely for a predetermined amount (ST02) to move the presser plate 115 to the initial position. That is, the presser plate 115 is in a state that the presser plate 115 is moved and remains in the opening formed between the pair of regulatory members 110 such that it is so arranged that the paper sheet or the like cannot pass through the opening until the insertion of a paper sheet or the like is detected by the insertion detecting sensor 7.

When the presser plate 115 is moved from the standby position to the initial position, the press waiting part 108 becomes in an open state (refer to FIG. 4) such that the apparatus is in a state that the paper sheet or the like can be conveyed into the bill housing part 100. That is, by driving the motor 20 to rotate reversely for a predetermined amount, the presser plate 115 is moved from the standby position to the initial position via the main body side gear train 21 and the presser plate driving mechanism 120 (the housing part side gear train 124, the rack formed on the movable member 122, and the link members 115*a*, 115*b*).

Further, the above-described roller up-and-down motor 70 is driven to move the upper conveyor roller 14A so as to make a contact with the lower conveyor roller 14B. In accordance therewith, the inserted paper sheet or the like is nipped and held therebetween by the pair of conveyor rollers (14A and 14B) (ST03).

Next, a traveling route opening process is conducted (ST04). The opening process is conducted by driving the pair of movable pieces 30A, 30B to move in separating directions so as to become apart with each other as the motor 40 for the skew correction mechanism is driven to rotate reversely as shown in the flow chart of FIG. 10 (ST100). At this time, when it is detected that the pair of movable pieces 10A have moved to the predetermined positions (the maximum open width positions) by the base part detecting sensor that detects positions of the pair of movable pieces 10A (ST101), the driving operation to rotate the motor 40 reversely is stopped (ST102). This traveling route opening process allows the paper sheet or the like to enter between the pair of movable pieces 10A. In addition, in the previous step of ST04, the bill traveling route 3 is in a closed state by a traveling route closing process (ST17, ST57) to be described later. Thus, the bill traveling route 3 is closed in this way before an insertion of the paper sheet or the like so as to prevent an element such as a line sensor from being broken by, for example, inserting a plate-like member from the bill insertion slot for illicit purposes or the like.

Next, the bill conveyor motor 13 is driven to rotate normally (ST05). The paper sheet or the like is conveyed into the inside of the apparatus by the conveyor roller pair (14A and 14B), and when the movable piece passage detecting sensor 12 installed on the downstream side from the skew correction mechanism 10 detects the leading end of the paper sheet or the like, the bill conveyor motor 13 is stopped (STO6 and ST07). At this time, the paper sheet or the like is located between the pair of movable pieces 10A constituting the skew correction mechanism 10.

Next, the above-described roller un-and-down motor 70 is driven to allow the conveyor roller pair (14A and 14B) holding the paper sheet or the like therebetween to become apart from each other (ST08). At this time, the paper sheet or the like is in a state that no load is applied.

Figure 11:
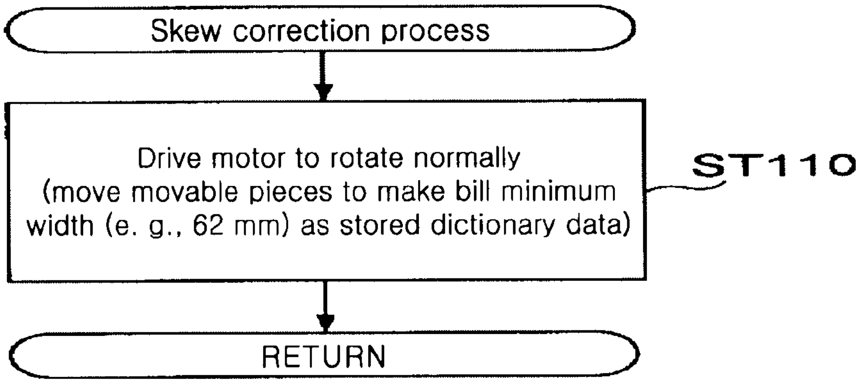
FIG. 11 shows a flowchart illustrating processing operations of a skew correction operating process.
Figure 12:
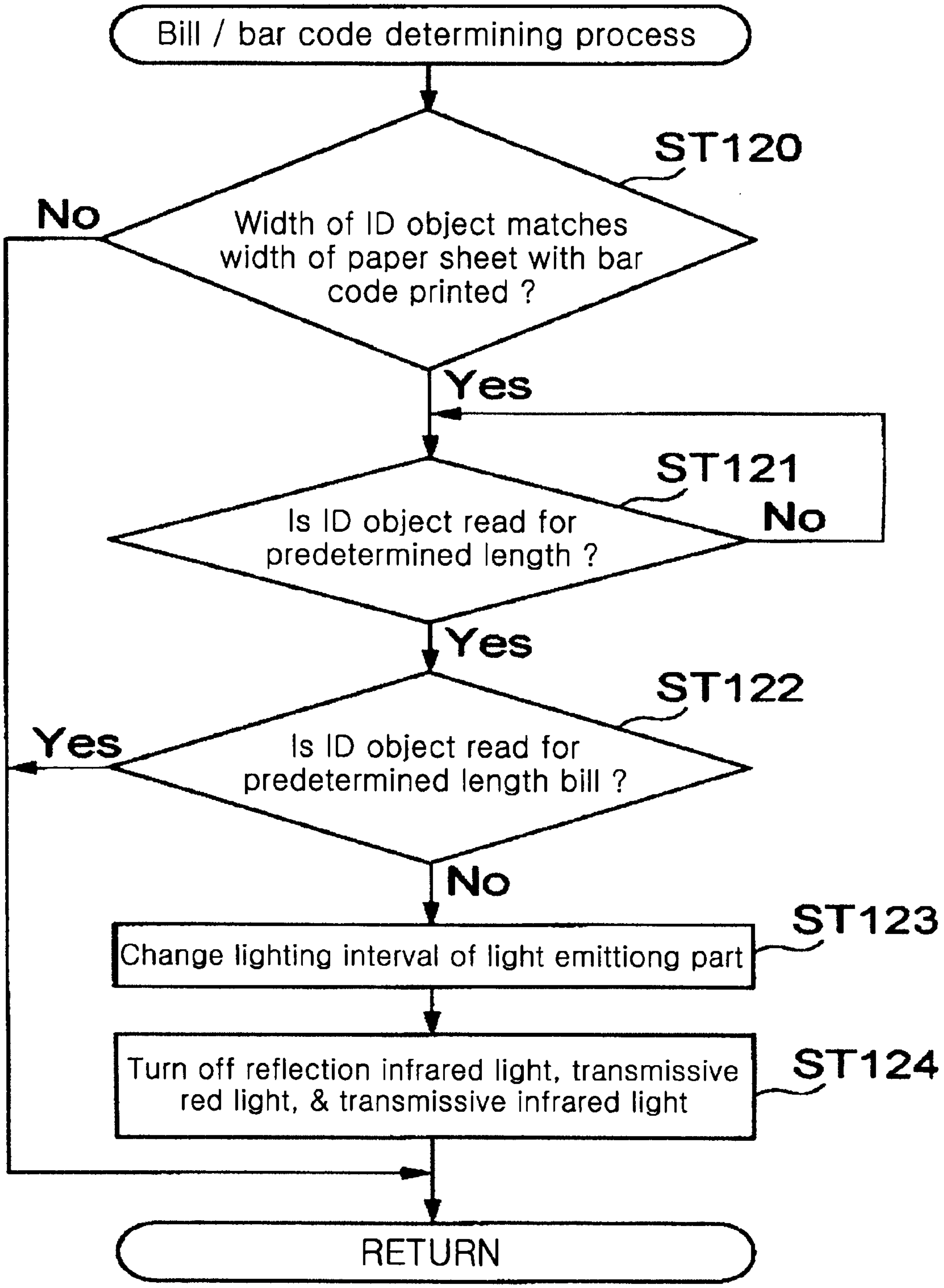
FIG. 12 shows a flowchart illustrating processing operations of a bill/bar-code determining process.

Then, a skew correction operating process is executed as the paper sheet or the like remains in this state (ST09). The skew correction operating process is conducted by driving the motor 40 for the skew correction mechanism to rotate normally to drive the pair of movable pieces 10A to get closer with each other. That is, in this skew correction operating process, as shown in the flowchart of FIG. 11, the motor 40 described above is driven to rotate normally to move the pair of movable pieces 10A in respective directions such that the pair of movable pieces 10A get closer with each other (ST110). The movement of the movable pieces is continued until the distance therebetween becomes the minimum width (for example; width of 62 mm) of the bill registered in the reference data storage part in the control means. And the skew is corrected by the movable pieces 10A touching both sides of the bill such that the bill may be positioned at the accurate center position.

When the skew correction operating process as described above is completed, a traveling route opening process is subsequently executed (ST10). This process is conducted by moving the pair of movable pieces 10A in separating directions as the above-described motor 40 for the skew correction mechanism is driven to rotate reversely (refer to ST100 to ST102 of FIG. 10).

Next, the above-described roller up-and-down motor 70 is driven to move the upper conveyor roller 14A to contact the lower conveyor roller 14B, and the paper sheet or the like is nipped and held between the pair of conveyor rollers (14A and 14B) (ST11). Thereafter, the bill conveyor motor 13 is driven to rotate normally to convey the paper sheet or the like into the inside of the apparatus, and when the paper sheet or the like passes through the bill reading means 8, a reading process of the paper sheet or the like is executed (ST12 and ST13). Further, in accordance therewith, the bar code sensor 88 starts reading the paper sheet or the like (ST14). FIG. 3B shows a position of the bill at this time. The bill M is held between the conveyor roller pair (15A and 15B) and conveyed from the traveling route 3A to the traveling route 3B by a rotation thereof. The figure shows that the leading end portion of the bill M is detected by the bar code sensor 88. Meanwhile, the timings that the bill reading means 8 starts reading and that the bar code sensor 88 starts reading may be different depending on the size (in particular, a length in the traveling direction) of the paper sheet or the like (including the bill) to be conveyed.

In the reading process of the paper sheet or the like, first, a bill/bar code determining process is executed (ST15). In this bill/bar code determining process, as shown in a flowchart of FIG. 12, first, it is determined whether or not the identification object has a width that matches that of the paper sheet on which the bar code is printed (ST120). That is, with respect to the paper sheet on which the bar code is printed, its width may be set to be the same as that of the bill in a predetermined country (bill to be used). Therefore, in the case where their widths do not match, the paper sheet is determined as the bill of another country than the predetermined country, and an authenticity judgment process (ST22), which will be described later, is executed.

Figure 15A:
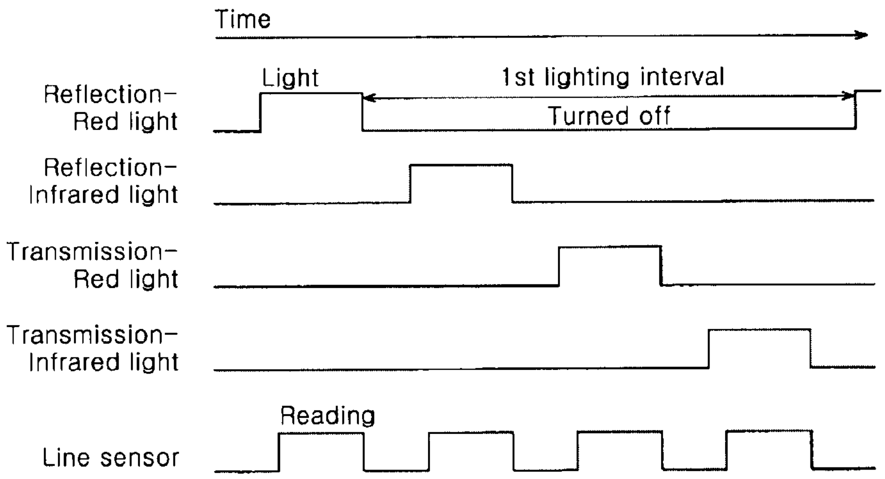
FIG. 15A shows a timing diagram illustrating lighting control of a light emitting part when a bill is read out with bill reading means.

Next, the identification object conveyed to the bill reading means 8 is read for a predetermined length (ST121). In reading the object for the predetermined length, as shown in a timing chart of FIG. 15A, the first light emitting part 80*a* and the second light emitting parts 81*b* are set in a bill reading state. That is, lighting control is performed such that the four light sources constituted of the transmitting light sources of the red light and the infrared light and the reflecting light sources of the red light and the infrared light in the first light emitting part 80*a* and the second light emitting parts 81*b* repeatedly turn on and off the lights with a constant interval (first lighting interval), and two or more of the light sources do not simultaneously turn on the lights even without overlapping the on-phases of the respective light sources in any case. In other words, lighting control is performed such that, while any one light source is turned on, the other three light sources are turned off. Thereby, as described in this embodiment, it is possible even for the one light receiving part 81*a* to detect each light from each light source at a constant interval such that an image constituted of contrasting density data on a printed area of the identification object can be read out by a transmitted light and a reflected light of the red light and a transmitted light and a reflected light of the infrared light.

Figure 15B:
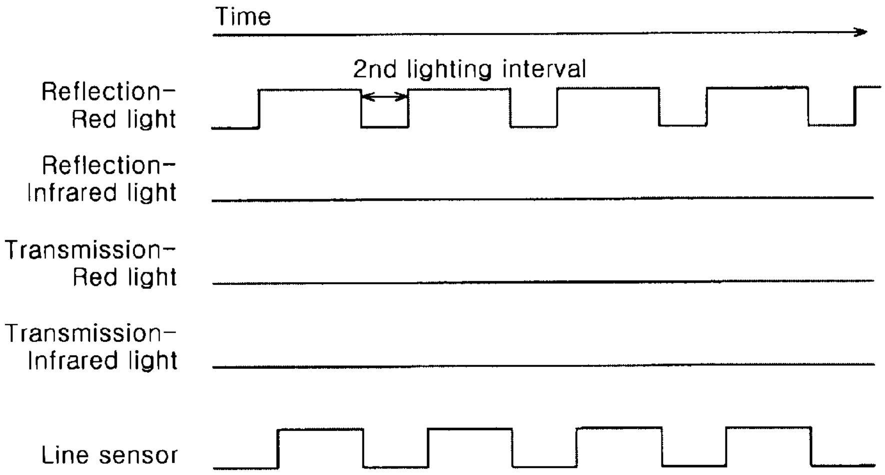
FIG. 15B shows a timing diagram illustrating lighting control of the light emitting part when a paper sheet having a bar code printed thereon is read out with the bill reading means.
Figure 15C:
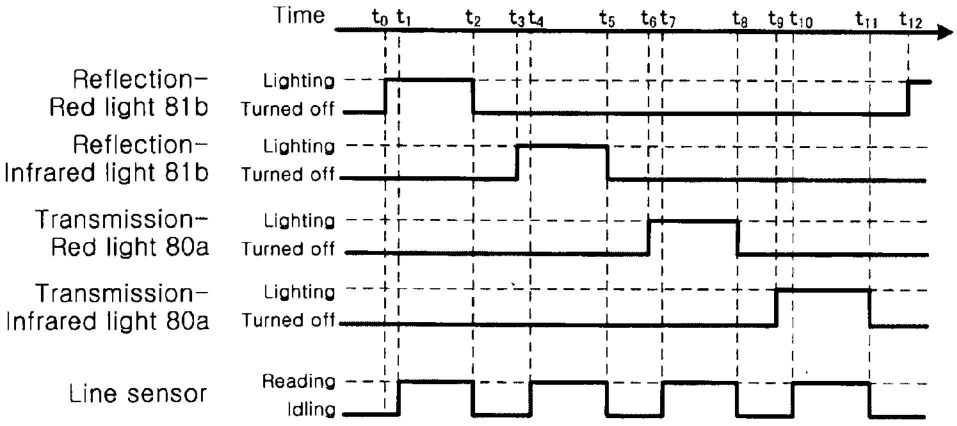
FIG. 15C shows a timing diagram illustrating lighting control of the light emitting part along a time line when the bill is read out with the bill reading means.

This embodiment is explained in detail with reference to the timing chart of FIG. 15C. At time $t_0$, the red light of the second light emitting parts 81*b* is turned on and the light receiving part (line sensor) 81*a* starts reading at time $t_1$ after a short time lag. At time $t_2$, the red light of the second light emitting parts 81*b* is turned off and the line sensor 81*a* immediately stops reading. Next, at time $t_3$, the infrared light of the second light emitting parts 81*b* is turned on and the line sensor 81*a* starts reading at time $t_4$ after a short time lag. At time $t_5$, the red light of the second light emitting parts 81*b* is turned off and the line sensor 81*a* immediately stops reading. Then, at time $t_6$, the red light of the first light emitting part 80*a* is turned on and the line sensor 81*a* starts reading at time $t_7$ after a short time lag. At time $t_8$, the red light of the first light emitting parts 80*a* is turned off and the line sensor 81*a* immediately stops reading. Next, at time $t_9$, the infrared light of the first light emitting part 80*a* is turned on and the line sensor 81*a* starts reading at time $t_{10}$ after a short time lag. At time $t_{11}$, the infrared light of the first light emitting parts 80*a* is turned off and the line sensor 81*a* immediately stops reading. Then, the red light of the second light emitting part 81*b* is turned on at time $t_{12}$ after the first lighting interval ($t_{12}$-$t_0$). In this way, since the respective light emitting parts do not emit the lights simultaneously in any case, a reading accuracy by the line sensor 81*a* is improved. On the other hand, the identification object is conveyed during this period of time and its reading position is changed from moment to moment. Therefore, if a lighting interval is long, a reading interval as well is roughened.

Next, in the above-described determining part 232, the identification object having been read for the predetermined length is determined as the bill or the paper sheet on which the bar code is printed (ST122). That is, the determining part 232 determines whether the conveyed identification object is the bill or the paper sheet on which the bar code is printed on based on the pixel information (pixel information containing a density value for each pixel) converted from the image read for the predetermined length by the converter 231. In detail, as shown in a schematic diagram of FIG. 16A, if the identification object S is the paper sheet on which the bar code is printed, the bar code is provided in the central area of the paper sheet. Therefore, when an average value of the pixel information read for an initial portion of approximately 10 mm is obtained, the average value is greater than that of the bill because a picture or character area is so small (or does not exist) that a degree of the white color is increased. Therefore, it is easily determined whether the identification object is the bill or the paper sheet on which the bar code is printed by receiving a reflected light (red light) for the initial portion of approximately 10 mm as the identification object is conveyed. In addition, it is a matter of course that it is possible to determine whether the identification object is the paper sheet on which the bar code is printed or the bill by receiving a transmitted light.

Then, when the identification object is determined as the bill, the lighting control of the first light emitting part 80*a* and the second light emitting parts 81*b* is performed with the abovementioned first lighting interval (ST122; Yes), and when the identification object is determined as the paper sheet on which the bar code is printed (ST122; No), the lighting interval of the second light emitting parts 81*b* is controlled to be changed to the second lighting interval (ST123). Further, in accordance with the process in ST123, the first light emitting part 80*a* is turned off (the transmissive red light and the infrared light are turned off) and the infrared light of the second light emitting parts 81*b* is turned off (ST124).

That is, with respect to the lights to be turned off, their light sources are not necessary for reading the bar code such that the lights are controlled to be turned off. As a result, as shown in a timing chart of FIG. 15B, irradiation of only the red light from the second light emitting parts 81*b* described above is controlled in a state that the lighting interval is shortened (lighting interval is controlled to be ¼ as compared to that in the case of the bill), and even in the case of the bar code information with thin line widths, the information can be read with the improved resolution.

Figure 13:
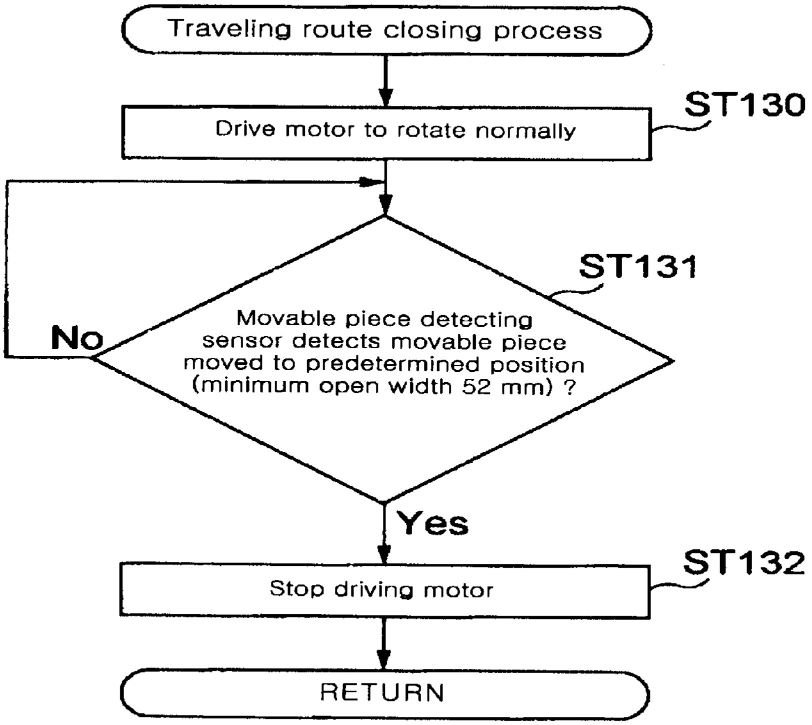
FIG. 13 shows a flowchart illustrating processing operations of a traveling route closing process.

Then, when the paper sheet or the like to be conveyed passes through the bill reading means 8, and the trailing end of the paper sheet or the like is detected by the movable piece detecting sensor 12 (ST16), a process for closing the bill traveling route 3 is executed (ST17). In this process, first, as shown in the flowchart of FIG. 13, after the trailing end of the paper sheet or the like is detected by the movable piece detecting sensor 12, the above-described motor 40 is driven to normally rotate to move the pair of movable pieces 10A in the directions that they get closer to each other (ST130). Next, when it is detected by the movable piece detecting sensor that the movable pieces 10A move to the predetermined positions (minimum open width positions: for example, width of 52 mm) (ST131), the driving operation of the normal rotation of the motor 40 is stopped (ST132).

With this traveling route closing process, the pair of movable pieces 10A are moved to the positions of the minimum open width (width of 52 mm) narrower than the width of any paper sheet or the like allowed to be inserted, thereby effectively preventing the paper sheet or the like from being drawn out. That is, by executing such a bill traveling route closing process, an opening distance between the movable pieces 10A is made shorter than the width of the inserted paper sheet or the like, thereby enabling the effective prevention of an action of drawing-out the paper sheet or the like in the direction toward the insertion slot by the operator for illicit purposes.

In addition, when the movable piece detecting sensor as described above detects the movement of the movable pieces 10A in this state, it may be considered that the operator is committing some fraudulent activities such that a predetermined processes may be executed. For example, a fraudulent manipulated signal (an anomaly sensed signal) may be transmitted to a higher-level apparatus that manages the operations of the bill processing apparatus, or an annunciator lamp may be provided on the bill processing apparatus, and this lamp may blink, or without activating a process for input acceptance (ST24) input by another operator thereafter, a process in which a discharge operation or the like is forcibly conveyed out may be executed. Or, appropriate processes such as canceling the operation of the bill processing apparatus (for example, a process for stopping the processing, a process for discharging the bill, and the like) and the like may be executed.

Further, in succession to the traveling route closing process described above (ST17), a conveyor roller pair spacing process is executed such that the above-mentioned roller up-and-down motor 70 is driven to make the conveyor roller pair (14A, 14B) having been in a state capable of nipping and holding the paper sheet or the like therebetween separate from each other (ST18). By executing the conveyor roller pair spacing process, even if the operator additionally inserts (double insertion) another paper sheet or the like by mistake, the paper sheet or the like is not subject to a feeding operation by the conveyor roller pair (14A, 14B) and hits front ends of the pair of movable pieces 10A in a closed state according to ST17 such that it is possible to reliably prevent the operation of double-insertion of the paper sheet or the like.

Along with the bill traveling route closing process, when the bill reading means 8 reads the data up to the trailing end of the paper sheet or the like, the bill conveyor motor 13 is driven for a predetermined amount and stops the paper sheet or the like in a predetermined position (an escrow position; a position where the trailing end of the paper sheet or the like is conveyed toward the downstream by 13 mm from the center position of the bill reading means 8), and at this time, an authenticity judgment process of the paper sheet or the like is executed in the judgment processing part 235 by referring to the legitimate data stored in the reference data storage part 233 in the authenticity judging part 230 of the aforementioned control means 200 (ST19 to ST22).

In addition, this escrow position is defined as a position where the bar code sensor 88 can complete reading of the bar code of the paper sheet inserted as the printed bar code is on the upper face, and detect the paper sheet.

Then, in the authenticity judgment process in ST22 described above, when the paper sheet or the like is judged as the legitimate one (ST23; Yes), an input from the operator is received (ST24). This input corresponds to an acceptance operation in which the operator presses an acceptance button in order to accept provision of services (for example, an acceptance process according to the start of a game in the case of a gaming unit), and a process in which the operator presses a return button in order to execute a process for returning the inserted paper sheet or the like.

Figure 14:
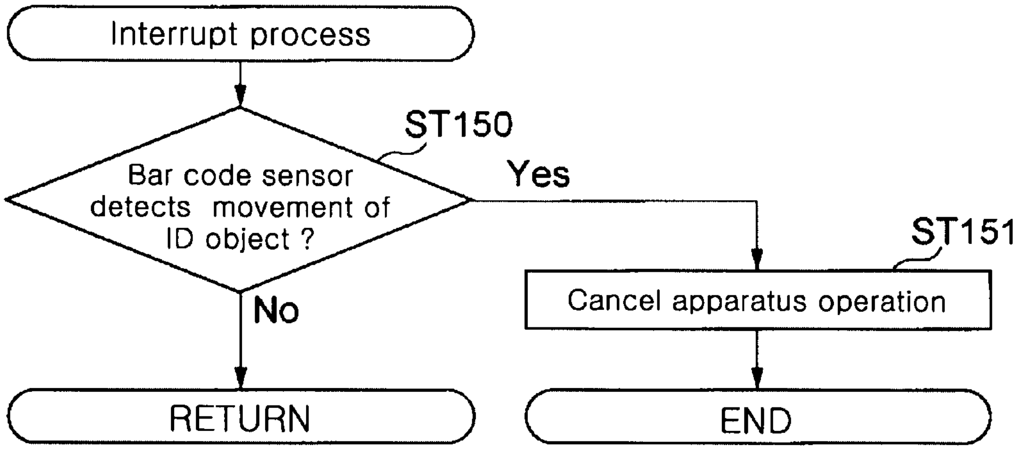
FIG. 14 shows a flowchart illustrating interrupt processing based on detection signal of a bar code sensor.

Further, during execution of the processes in ST23 and ST24, an interrupt process as shown in FIG. 14 is executed. With respect to this interrupt process, when the bar code sensor 88 detects a movement of the identification object (ST150; Yes), which means that the identification object originally staying in the escrow position is moved, and it is regarded as some kind of fraudulent activity being committed, a process of cancelling the operation of the apparatus (for example, stopping of the conveyance mechanism, discharging of a paper sheet or the like, stopping of a transaction process with higher-level apparatuses, and the like) is executed (ST151).

Then, when an operation to accept the provision of various types of services is input (ST25; Yes), the bill conveyor motor 13 is consecutively driven to rotate normally to convey the paper sheet or the like in this state toward the bill housing part 100 (ST26).

In the process of ST26, the bar code sensor 88 has detected an existence of the identification object (ST27), and when the existence of the paper sheet or the like is not recognized at the stage of a conveying process for the paper sheet or the like (within a period of time of a movement of the paper sheet or the like), it is judged that the paper sheet or the like has been drawn out or the like, and a process of cancelling the operation of the apparatus is executed (ST27; No. ST40). Further, in the process of ST26, since the period of time of the movement of the paper sheet or the like from the bar-code sensor 88 is specified, the period has been detected (ST28), and when the bar code sensor 88 detects the presence of the identification object after the time passes (ST28; Yes), it is judged that the paper sheet or the like is jammed, a process of cancelling the operation of the apparatus is executed (ST29; No, ST40).

Then, when the paper sheet or the like is conveyed in the process of ST26, the bill conveyor motor 13 is driven to rotate normally until the trailing end of the paper sheet or the like is detected by the discharge detecting sensor 18 (ST30), and after the trailing end of the paper sheet or the like is detected by the discharge detecting sensor 18, the bill conveyor motor 13 is driven to rotate normally for the predetermined amount (ST31 and ST32).

The process for driving the bill conveyor motor 13 to rotate normally in ST31 and ST32 corresponds to a driving amount for which the paper sheet or the like is conveyed in the receiving port 103 of the bill housing part 100 from the discharge slot 3*a* on the downstream side of the bill traveling route 3 of the apparatus main body 2 so that the pair of belts 150 contact the surface on both sides of the conveyed-in bill to guide it stably to the press standby part 108. That is, by further driving the bill conveyor motor 13 to rotate normally for a predetermined amount after the trailing end of the paper sheet or the like is detected by the discharge detecting sensor 18, the pair of belts 150 contact the paper sheet or the like conveyed-in and are driven in the feeding direction so as to guide the paper sheet or the like in a stable state to the press standby part 108.

Then, after the above-described bill conveyor motor 13 is stopped, the process for driving the presser plate 115 is executed (ST33) such that the paper sheet or the like is placed on the placing plate 105. And, after the pressing process is completed, the presser plate 115 is again moved to the standby position and stopped to the position.

Further, in the above-mentioned process of ST23, when the paper sheet or the like is judged as a non-legitimate one or the operator presses the return button (ST25; No), a traveling route opening process is executed (ST51, refer to ST100 to ST102 of FIG. 10). After that, the bill conveyor motor 13 is driven to rotate reversely and the conveyor roller pair (14A, 14B) are brought into contact with each other such that the paper sheet or the like waiting at the escrow position is conveyed toward the bill insertion slot 5 (ST52 and ST53). Then, when the insertion detecting sensor 7 detects the trailing end of the paper sheet or the like to be returned toward the bill insertion slot 5, the driving to reversely rotate the bill conveyor motor 13 is stopped, and above-described roller up-and-down motor 70 is driven to make the conveyor roller pair (14A and 14B) in a state of nipping and holding the paper sheet or the like therebetween separate from each other (ST54 to ST56). After that, the traveling route closing process is executed (refer to ST57, and ST130 to ST132 in FIG. 13) and the driving motor 20 for the presser plate 115 is driven to rotate normally (ST58) such that the presser plate 115 positioned at the initial position is driven to move to the standby position, and then a series of processes are completed.

According to the abovementioned configuration of the bill processing apparatus 1, the paper sheet or the like inserted from the bill insertion slot is first determined as the bill or the paper sheet on which the bar code is printed by the determining part 232. Then, in accordance with the thus-determined result, the light emission controlling parts 220, 222, and 260 change the resolution of the line sensor, i.e., change the lighting intervals of the first light emitting part 80*a* and the second light emitting parts 81*b* so as to obtain the optimum resolution for judging the authenticity of the bill or the paper sheet on which the bar code is printed. Accordingly, since it is possible to perform an authenticity judgment of the bill and an authenticity judgment of the paper sheet on which the bar code is printed by utilizing the common line sensor as the lighting interval of the light emitting part is changed, it is possible to provide a bill processing apparatus capable of performing the authenticity judgment of the bill or the bar-coded paper sheet or the like inexpensively.

Figure 18:
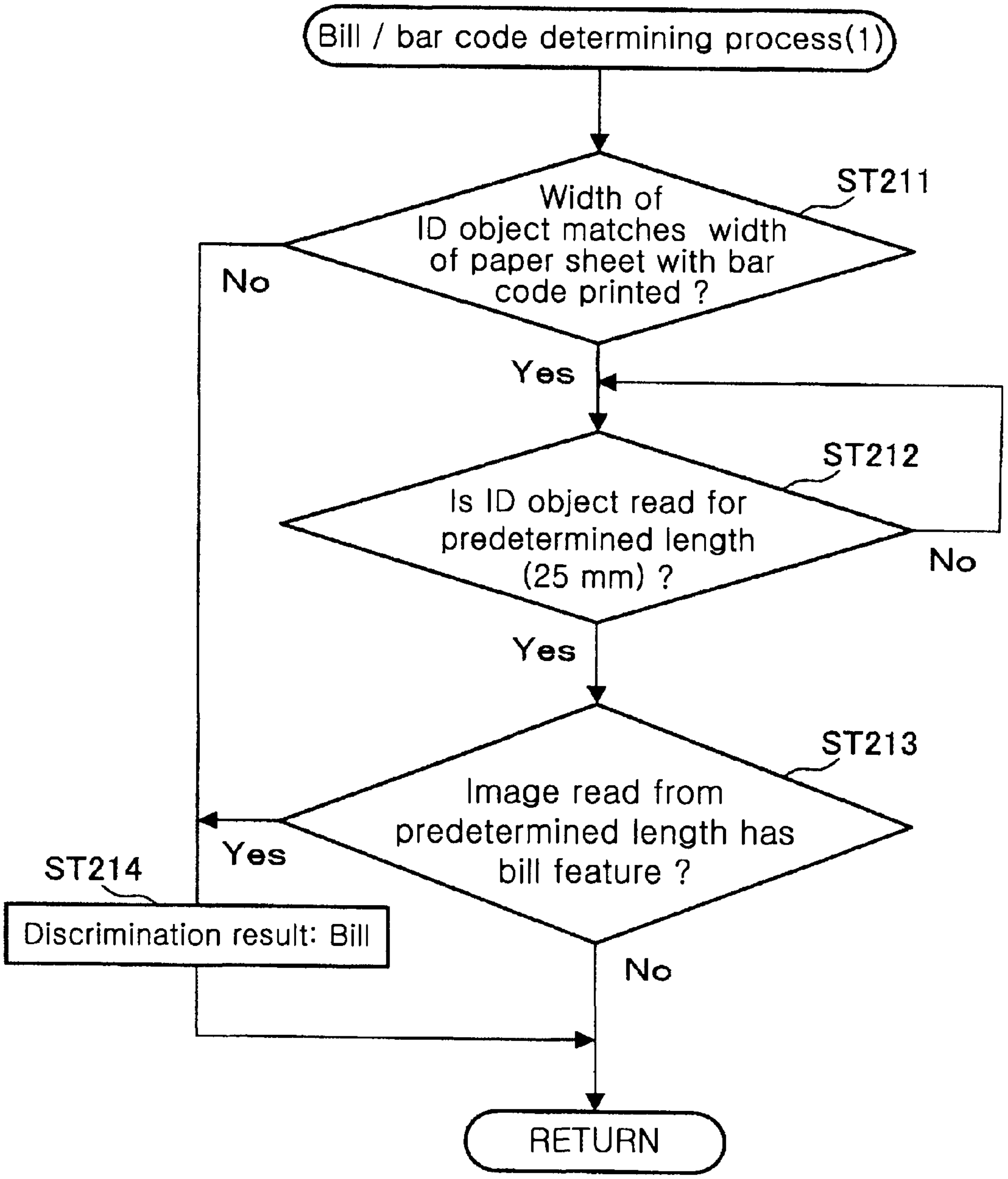
FIG. 18 shows a flowchart illustrating processing operations of a bill/bar-code determining process (1).
Figure 19:
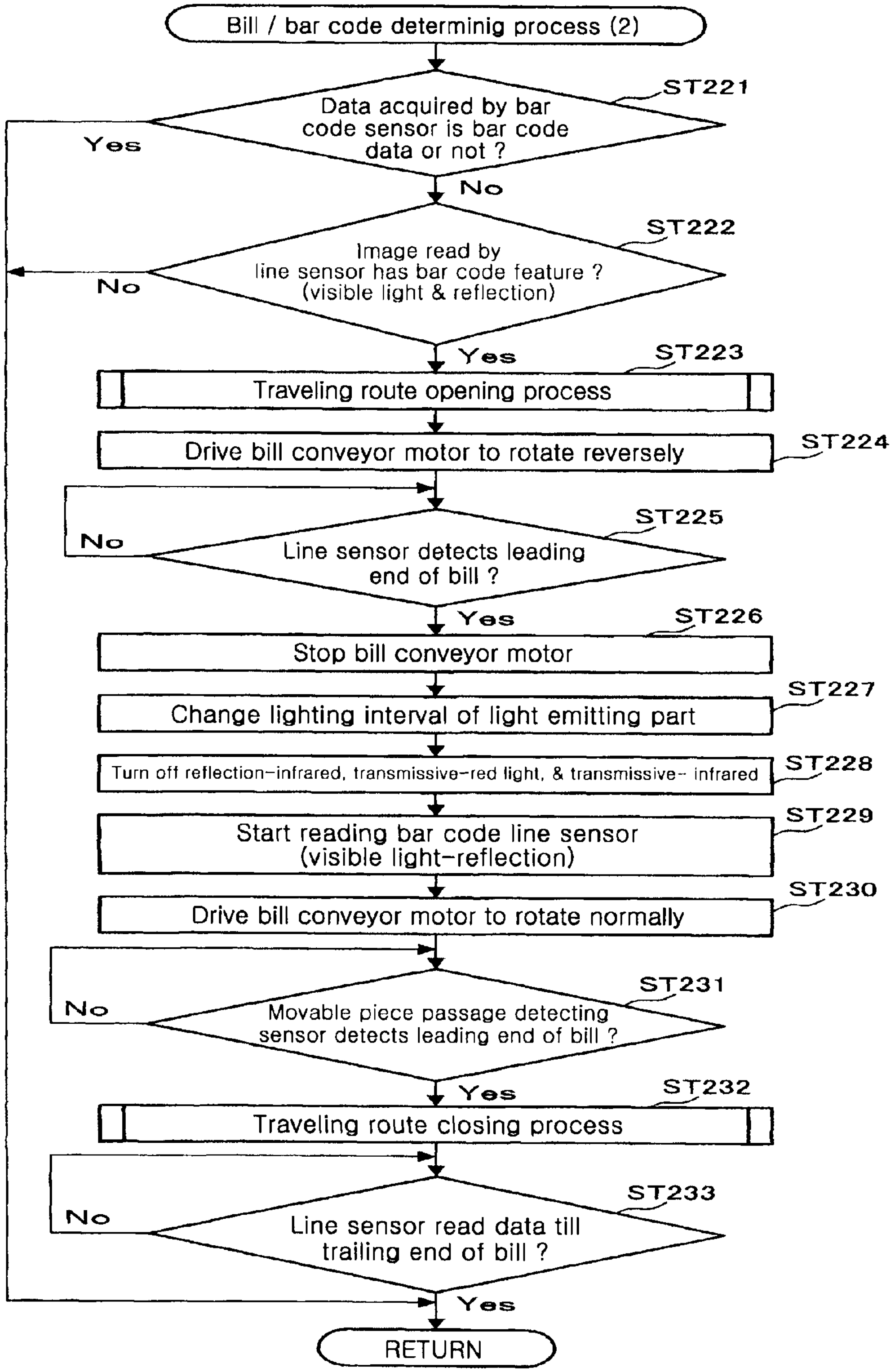
FIG. 19 shows a flowchart illustrating processing operations of a bill/bar code determining process (2).

As a different type of embodiment from the above-described embodiment of the bill processing apparatus 1, the bill processing operations will be described according to the flowcharts of FIGS. 17 to 19. Since FIGS. 7, 9-11, and 13-15C are commonly used such that the explanation to be duplicated will be omitted.

Figure 16B:
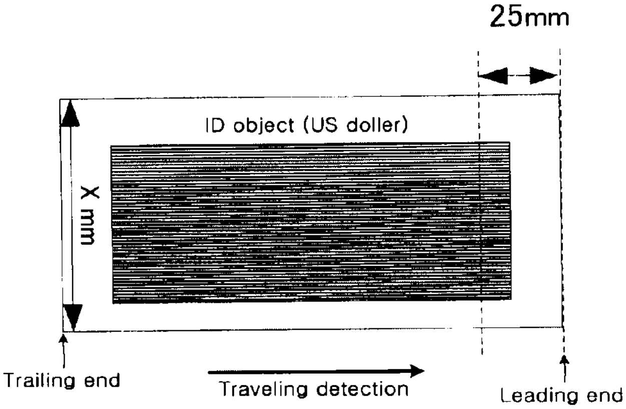
FIG. 16B is a schematic diagram showing a read-out processing of a United States dollar bill having an identification object.
Figure 16C:
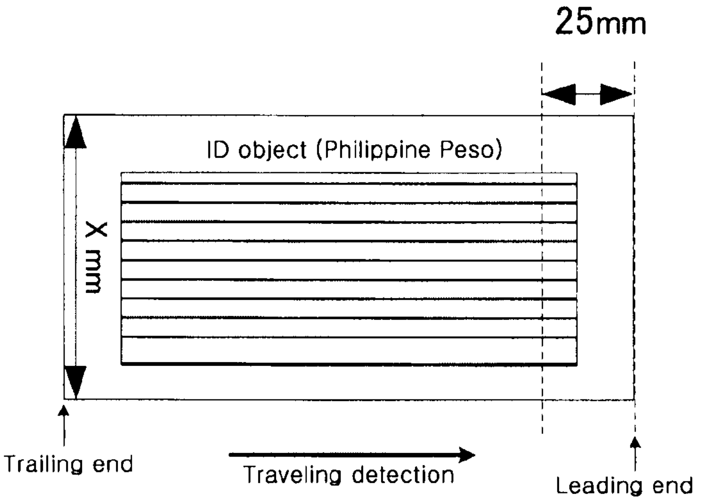
FIG. 16C is a schematic diagram showing a read-out processing of a Philippine peso bill having an identification object.
Figure 16D:
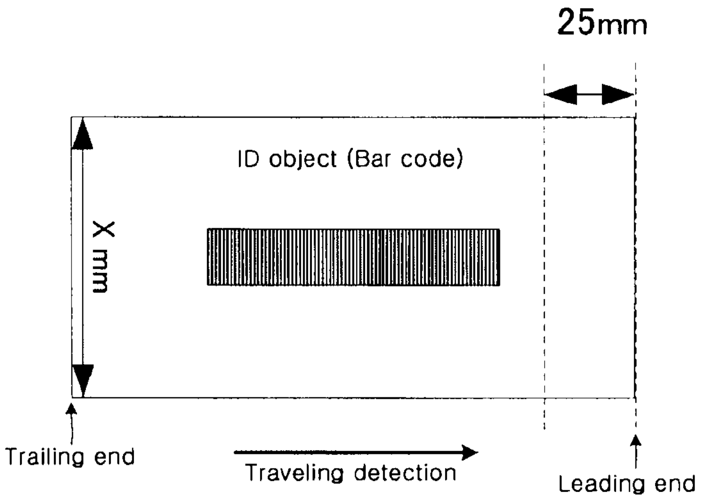
FIG. 16D is a schematic diagram showing a read-out processing of the paper sheet having the bar code printed thereon as an identification object.

In the case of adjusting the apparatus to accept bills of a plurality of countries, since these bills may be printed with inks containing components easily absorbing light (for example: United States dollar, FIG. 16B), and may be printed with inks containing components little absorbing light (for example: Philippine peso, FIG. 16C), it may be difficult to determine whether the identification object is the bill or the bar-coded ticket in the process of the embodiment as described above. For example, as shown in FIGS. 16B to 16D, when the United States dollar bill, the Philippine peso bill, and the bar-coded ticket (FIG. 16D) are formed with a piece of paper having substantially the same size (width) of X mm, it is impossible to determine the identification object based on the size of the paper. Further, when the bar code is printed on the surface (upper surface in FIG. 3B) of the bar-coded ticket, it is possible to read the bar code by the bar code sensor (second sensor) 88. However, when the bar code is printed on the back (bottom surface in FIG. 3B), it is impossible to read the bar code by the bar code sensor 88.

Then, it is possible to provide an identification apparatus capable of handling bills of the respective countries by carrying out the following process. A paper sheet or the like including a bill is inserted into the bill insertion slot 5 (ST01, FIG. 7), the paper sheet or the like is corrected by the skew correction mechanism 10 (ST09, FIG. 7), and a traveling route opening process is executed (ST10, FIG. 7).

Figure 17:
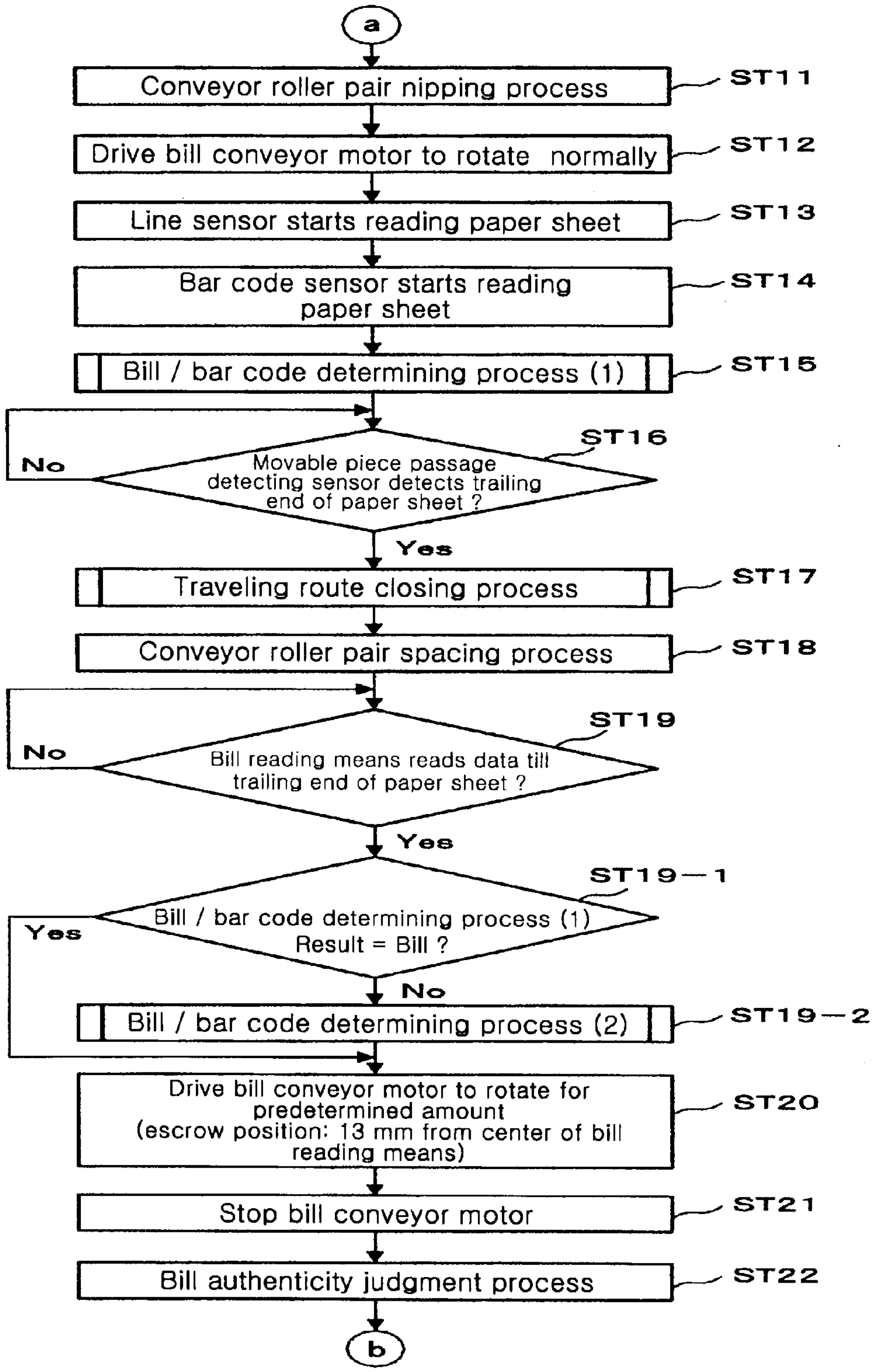
FIG. 17 shows a flowchart illustrating processing operations for processing a bill with a bill processing apparatus of another embodiment correspond to FIG. 8.

Then, the paper sheet or the like is held between the pair of conveyor rollers (14A and 14B) (ST11, FIG. 17). Thereafter, the paper sheet or the like is conveyed toward the inside of the apparatus, and when the paper sheet or the like passes through the bill reading means 8, a reading process of the paper sheet or the like is executed (ST12, ST13 and FIG. 17). Then, in the reading process of the paper sheet or the like, first, a bill/bar code determination process (1) is executed (ST15). In this bill/bar code determination process, as shown in a flowchart of FIG. 18, first, it is determined whether or not the identification object has the width that matches the width of the paper sheet on which the bar code is printed (ST211). That is, with respect to the paper sheet on which the bar code is printed, its width may be set to be the same as that of the bill in a predetermined country (bill to be used). Therefore, in the case where their widths do not match, the paper sheet is determined as the bill of another country than the predetermined country, and an authenticity judgment process (ST22), which will be described later, is executed.

Next, the identification object conveyed to the bill reading means 8 is read for a predetermined length (for example, 25 mm) (ST212). In reading the object for the predetermined length, as shown in a timing chart of FIG. 15A, the first light emitting part 80*a* and the second light emitting parts 81*b* are set in a bill reading state. That is, lighting control is performed such that the four light sources constituted of the transmitting light sources of the red light and the infrared light and the reflecting light sources of the red light and the infrared light in the first light emitting part 80*a* and the second light emitting parts 81*b* repeatedly turn on and off the lights with a constant interval (first lighting interval), and two or more of the light sources do not simultaneously turn on the lights even without overlapping the on-phases of the respective light sources in any case. Thereby, as described in this embodiment, it is possible even for the one light receiving part 81*a* to detect each light from each light source at a constant interval such that an image constituted of contrasting density data on a printed area of the identification object can be read out by a transmitted light and a reflected light of the red light and a transmitted light and a reflected light of the infrared light.

Next, in the above-described determining part 232, the identification object having been read for the predetermined length is determined as the bill or the paper sheet on which the bar code is printed (ST213). Concretely, as shown in the schematic diagrams of FIGS. 16B to 16D, in the case of the bill, an identification object starts to appear by reading an initial portion of approximately 25 mm, and the read pixel information is different from that in the case of the bar code where an identification object does not start to appear by reading an initial portion of 25 mm. That is, since the bar code is provided in the central area of the paper sheet, when an average value of the pixel information read for an initial portion of approximately 25 mm is obtained, the average value is greater than that of the bill because a picture or character area is so small (or does not exist) that a degree of the white color is increased. Since it cannot be detected in advance whether the surface on which the bar code is printed is set on the upper side or the lower side of the paper sheet to be inserted, it is easily determined whether the inserted object is the bill or the paper sheet on which the bar code is printed by receiving a transmitted light for the initial portion of approximately 25 mm as the paper sheet or the like having the identification object is conveyed.

Then, when the paper sheet or the like with the identification object is determined as the bill, the lighting control of the first light emitting part 80*a* and the second light emitting parts 81*b* is performed with the abovementioned first lighting interval (ST213; Yes, FIG. 18), and the determination result of being the bill is stored. On the other hand, in the case where the paper sheet or the like with the identification object does not have the feature of the bill and it cannot be determined whether it is the bill or the bar-coded ticket (ST213; No. in FIG. 18), the determination result of being the bill is not stored, and the process returns to the flow of FIG. 17. In addition, here, the portions of 25 mm from the leading end is read with the transmission of the infrared to identify the identification object such that what is clearly determined as the bill from the image is excluded. The reason why the images identified by utilizing the transmission of the infrared light is that, although many of the bills are printed with inks absorbing the infrared light, the bar-coded ticket has such a small printed area even if it is printed with inks absorbing the infrared light such that it is easy to distinguish the ticket from the bill. However, since there are bills such as the Philippine peso having low sensitivities to the infrared light, a “bill/bar code determining process (2)”, which will be described later, is carried out.

That is, with respect to the lights to be turned off, their light sources are not necessary for reading the bar code such that the lights are controlled to be turned off. As a result, as shown in a timing chart of FIG. 15B, irradiation of only the visible light from the second light emitting parts 81*b* described above is controlled in a state that the lighting interval is shortened (lighting interval is controlled to be ¼ as compared to that in the case of the bill), and even in the case of the bar code information with thin line widths, the information can be read with the improved resolution. Further, although images detected by the transmission of the visible light are not utilized here, this is because an advertisement may be printed on the back surface of the bar-coded ticket in some cases so that it may be judged as the bill by mistake. Accordingly, in the case where there is no printing on the back surface of the bar-coded ticket or under other suitable conditions, images detected by the transmission of the visible light can be utilized, which is also incorporable into the present invention of this application.

Returning to the main flow of FIG. 17, when the paper sheet or the like to be conveyed passes through the bill reading means 8, and the trailing end of the paper sheet or the like is detected by the movable piece detecting sensor 12 (ST16), a process for closing the bill traveling route 3 is executed (refer to ST17 in FIG. 13). Then, a conveyor roller pair spacing process to separate the conveyor roller pair (14A and 14B) is executed (ST18).

At the same time of the above-mentioned bill traveling route closing process, when the bill reading means 8 reads the data up to the trailing end of the paper sheet or the like (ST19), the determination result of the bill/bar code determining process (1) is confirmed (ST19-1). Here, when the determination result is the bill (ST19-1; Yes, FIG. 17), a process of conveying the paper sheet or the like to the escrow position is performed (ST20). On the other hand, when the determination result is not the bill (ST19-1; No, FIG. 17), the process proceeds to a process of a bill/bar code determining process (2) as shown in FIG. 19 (ST19-2).

In the bill/bar code determining process (2), it is confirmed whether or not the data acquired by the bar code sensor 88 is data through the bar code (ST221). In the case where information through the bar code is acquired (ST221; Yes), it is judged that the paper sheet or the like is inserted as its printed bar code is on the upper side, and the process is returned to the main flow. On the other hand, in the case where a bar code cannot be confirmed (ST221; No), it is judged whether or not the image read by the line sensor of the bill reading means 8 has the feature of the bar code (ST222). For example, when there is an image having the feature of the bar code among the images read with the reflected visible light, it may be judged that the paper sheet or the like is inserted as the surface on which the bar code is printed is on the lower side. Further, in the reading by the line sensor of the bill reading means 8, the light emission control as shown in FIG. 15B is not performed, and therefore, the bar code on the bottom surface of the paper sheet or the like cannot be read accurately. However, if the reflected image by the visible light in the entire paper sheet or the like is confirmed, it is possible to determine the presence or absence of the bar code on the bottom side of the paper sheet or the like. Further, when it is judged that the paper sheet or the like does not have the feature of the bar code (ST222; No), it may be a bill. Therefore, the process returns to the main flow, and an authenticity judgment (ST22), which will be described later, is executed.

Figure 10:
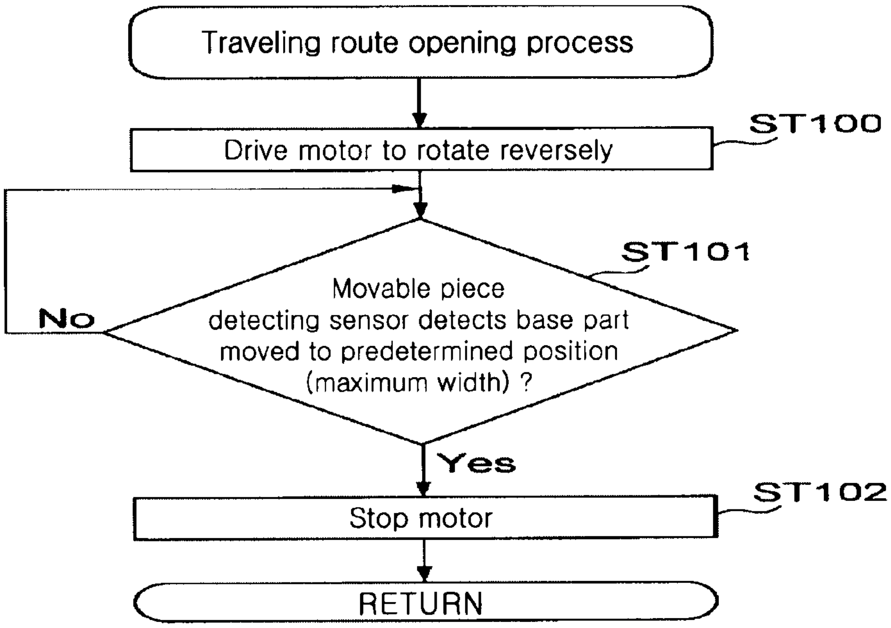
FIG. 10 shows a flowchart illustrating processing operations of a traveling route opening process.

When it is judged that the object is the bar-coded ticket because it has the feature (ST222; Yes), a process of conveying back the paper sheet or the like once is performed in order to accurately read the bar code, and reading of the bar code is again performed after the light emission is controlled. Concretely, the traveling route opening process as shown in FIG. 10 is executed (ST223). Then, the bill conveyor motor is driven to inversely rotate (ST224), and the backward conveyance is continued until the line sensor of the bill reading means 8 detects the leading end of the bill (because the bill is conveyed backward, the leading end in the traveling direction is detected lastly by the line sensor. Refer to FIGS. 16A to 16D). After the leading end is detected (ST225; Yes), the bill conveyor motor 13 is stopped (ST226), and the lighting interval of the light emitting part is changed (ST227), and the reflection infrared light, the transmissive red light, and the transmissive infrared light are turned off (ST228). In this way, the bar-coded ticket is returned in front of the line sensor in order to perform re-reading of the bar code, and the respective types of light emitting parts and sensors become ready.

Next, reading of the bar code by the line sensor of the bill reading means 8 with respect to the paper sheet or the like with the bar code printed on its bottom surface is started with the visible light (ST229). Then, the bill conveyor motor 13 is driven to normally rotate (ST230) and it is continued until the movable piece passage detecting sensor 12 detects the trailing end of the bill (ST231). Thereafter, the traveling route closing process as shown in FIG. 13 is performed (ST232), it is confirmed that the line sensor has read data up to the trailing end of the bill (St233; Yes), and the process is returned to the main flow.

After the bill/bar code determining process, the process is returned to FIG. 17 and the bill conveyor motor 13 is driven for a predetermined amount (ST20), and stops the paper sheet or the like in a predetermined position (an escrow position; a position where the trailing end of the paper sheet or the like is conveyed toward the downstream by 13 mm from the center position of the bill reading means 8), and at this time, an authenticity judgment process of the paper sheet or the like is executed in the judgment processing part 235 by referring to the legitimate data stored in the reference data storage part 233 in the authenticity judging part 230 of the aforementioned control means 200 (ST22). The follow process proceeds to the flow chart of FIG. 9, the duplicated description is omitted.

As described above, in the other embodiment, it is possible to provide a bill processing apparatus capable of handling bills of respective countries. Further, in the above-mentioned embodiment, when it is started to read an identification object, the identification object is irradiated with the light with the first lighting interval suitable for reading the bill, and the control of changing the lighting interval by the light emission control part may be performed in the case where the identification object is determined as the bar code. Therefore, an unnecessary control time of the light emission control part is eliminated, which makes it possible to reduce a period of time required for the authenticity judgment. In this case, in the case where the identification object is the paper sheet on which the bar code having a narrow line width and pitch is printed, the identification object is irradiated with the light with the second lighting interval shorter than the first lighting interval, which makes it possible to make an attempt to improve the resolution, and it is possible to appropriately read the bar code information by utilizing the same light source irradiating the bill with the light.

Further, in this embodiment, since the authenticity judgment is performed with a plurality of light sources (a plurality of light sources of the red light and the infrared light), it is possible to improve the identification accuracy for the authenticity of the bill. Moreover, in the case of the paper sheet on which the bar code is printed, it is possible to read the paper sheet even with a single light source, and therefore, wasteful light emission control by utilizing a plurality of light sources is prevented.

As mentioned above, the embodiment of the present invention is described. However, the present invention is not limited to the above-described embodiment, and various modifications of the embodiment can be implemented. In the present invention, it suffices that the bill reading means 8 is configured to be controlled to change the lighting interval of the light emission to irradiate the bill with the light between in the case where the reading object is the bill and in the case where the reading object is the paper sheet, but specific authenticity identification methods and the kinds of the light sources to be utilized and an arrangement thereof can be modified as appropriate. Further, the driving sources that drive various types of driving members installed in the bill processing apparatus or the power transmission mechanism from the driving sources may be appropriately modified.

According to the bill processing apparatus of the above-mentioned embodiment, the light emitting part irradiates the identification object with the light and the light from the identification object is received by the light receiving part such that it is possible to perform the authenticity judgment of the identification object. In this case, first, the identification object is determined to be the bill or the paper sheet on which the bar code is printed. Then, in accordance with the determination result, the light emission control parts change the resolution in the light receiving part, i.e., change the lighting interval in the light emitting part so as to have the optimum resolution for judging the authenticity of the bill or the paper sheet on which the bar code is printed. Accordingly, since it is possible to perform the authenticity judgment for the bill and the authenticity judgment for the paper sheet on which the bar code is printed by utilizing the common light receiving part by changing the lighting interval of the light emitting part, a bill processing apparatus capable of performing the authenticity judgment for the bill and the bar-coded paper sheet inexpensively can be provided.

Further, the light emission control part controls irradiation of the light to the identification object with the first lighting interval, and when the identification object is determined as the paper sheet on which the bar code is printed by the determining part, it is possible to irradiate the identification object with the light with the second lighting interval that is shorter than the first lighting interval.

In such a configuration, at the beginning of reading the identification object, the identification object is irradiated with the light with the first lighting interval, and it suffices that the control for changing the lighting interval by the light emission control part may be performed when the identification object is determined to be the bar code, whereby an unnecessary control time by the light emission control part may be eliminated, which makes it possible to reduce the time required for the authenticity judgment. Further, in the case where the identification object is the paper sheet on which the bar code having a narrow line width and a narrow pitch thereof is printed, the identification object is irradiated with light with the second lighting interval that is shorter than the first lighting interval such that the resolution may be improved and that the bar code information may be read appropriately by utilizing the same light source irradiating the bill with the light as it is used in the case of the bill.

Further, the light emitting part has the plurality of light sources, and the light emission control part is capable of selecting a predetermined light source among the plurality of light sources in accordance with the identification object having been determined by the determining part.

In such a configuration, since a light source suitable for identifying the identification object can be selected, the identification accuracy may be improved. For example, in the case of the bill, the authenticity judgment accuracy can be improved by utilizing a plurality of light sources such as the visible light and the infrared light, while, in the case of the paper sheet on which the bar code is printed, it is possible to read it with even a single light source such that it is possible to prevent wasteful light emission control caused by utilizing a plurality of light sources.

Further, the apparatus includes the converter which converts the light received by the light receiving part into pixels containing color information having brightness in a predetermined size as a unit, and the determining part is capable of determining whether the identification object is the bill or the paper sheet on which the bar code is printed based on the pixels converted by the converter.

In such a configuration, it is possible to determine what the identification objects is by the light receiving part and the light emitting part which can be commonly utilized in the authenticity judgment of the bill or the paper sheet on which the bar code is printed, and further it is possible to provide a bill processing apparatus which can perform the authenticity judgment of the bill or the paper sheet on which the bar code is printed inexpensively.

Further, the authenticity judgment processing method of the above-mentioned embodiment which is provided with the light emitting part that irradiates the identification object passing through the traveling route with the light, and the light receiving part that receives the light from the identification object to which the light emitting part irradiates the light, the method of determining the identification object passing through the traveling route as the bill or the paper sheet on which the bar code is printed based on the light received by the light receiving part, and for judging the authenticity of the identification object, the method comprises a determination process of determining the identification object passing through the traveling route as the bill or the paper sheet on which the bar code is printed, and a lighting interval changing process of changing the lighting interval of the light with which the light emitting part irradiates the identification object, in accordance with the identification object having been determined by the determination process.

According to the authenticity judging process method of the above-described embodiment, the light is irradiated from the light emitting part to the identification object and the light from the identification object is received by the light receiving part whereby it is possible to perform the authenticity judgment of the identification object. In this case, first, the identification object is determined as the bill or the paper sheet on which the bar code is printed in the determining step. Then, in accordance with the determination result, the resolution at the light receiving part is changed, that is, the lighting interval of the light emitting part is changed so as to obtain the optimum resolution for judging the authenticity of the bill or the paper sheet on which the bar code is printed. In this way, since it is possible to perform the authenticity judgment of the bill and the authenticity judgment of the paper sheet on which the bar code is printed with the common light receiving part by changing the lighting interval of the light emitting part, the authenticity judgment of the bill or the bar-coded paper sheet can be performed inexpensively.

Further, in the lighting interval changing step, the identification object to be conveyed is irradiated with the light with a first lighting interval, and when the identification object is determined as the bill by the determining process, the identification object is irradiated with the light with the first lighting interval, and when the identification object is determined as the paper sheet on which the bar code is printed, it is possible to change the light irradiation onto the identification object being conveyed to be performed with a second lighting interval.

In such a configuration, when the identification object is determined in the determination step, the irradiation is performed with the first lighting interval with which the bill authentication judgment can be made, and when it is determined the identification object is the bill, the bill is continuously irradiated with the light with the first lighting interval so as to perform the authenticity judgment of the bill. Further, when the identification object is determined as the paper sheet on which the bar code is printed in the determining step, the lighting interval is now changed from the first lighting interval to the second lighting interval, and the paper sheet is irradiated with the light to perform the authenticity judgment of the paper sheet. Therefore, it is easy to control the light emission of the light emitting part, which makes it possible to reduce the time required for the authenticity judgment.

Further, the light emitting part has the plurality of light sources, and it is possible to have a selection step in which the light emission control part is capable of selecting a predetermined light source among the plurality of light sources in accordance with the identification object having been determined in the determining process.

In such a configuration, it is possible to select a light source suitable for identifying the identification object, thereby enabling improvement of the identification accuracy. For example, in the case of the bill, the authenticity judgment accuracy can be improved by utilizing the plurality of light sources such as visible light and infrared light, in the case of the paper sheet on which the bar code is printed, since it is possible to read it with a single light source, it is possible to prevent wasteful light emission control by utilizing the plurality of light sources.

As described above, there is provided a bill processing apparatus capable of performing the authenticity judgment of the bill and the bar-coded paper sheet inexpensively, and the authenticity judgment processing method used in the bill processing apparatus is also provided.

The present invention can be incorporated into various types of apparatuses to provide products and services by inserting a bill thereinto, for example.

What is claimed is:

1. A bill processing apparatus comprising:
- a light emitting part which irradiates light to an identification object passing through a traveling route;
- a light receiving part which receives light from the identification object irradiated by the light emitting part;
- a determining part which determines whether the identification object is a bill or a paper sheet on which a bar code is printed based on the light received by the light receiving part; and
- a light emission control part which controls emission of the light emitting part;
- wherein the light emission control part changes a lighting interval in accordance with the identification object having been determined by the determining part.

2. The bill processing apparatus according to claim 1, wherein:
- the light emission control part irradiates light with a first lighting interval, and
- the light emission control part irradiates the light with a second lighting interval that is shorter than the first lighting interval when it is determined that the identification object is the paper sheet on which the bar code is printed.

3. The bill processing apparatus according to claim 2, wherein:
- the light emitting part comprises a plurality of light sources, and
- the light emission control part selects a predetermined light source among the plurality of light sources in accordance with the identification object having been determined by the determining part.

4. The bill processing apparatus according to claim 3, comprising:
- a converter which converts the light received by the light receiving part into pixels containing color information including brightness, each of the pixels having a predetermined size as a unit,
- wherein the determining part determines whether the identification object is the bill or the paper sheet on which the bar code is printed based on the pixels converted by the converter.

5. The bill processing apparatus according to claim 2, comprising:
- a converter which converts the light received by the light receiving part into pixels containing color information including brightness, each of the pixels having a predetermined size as a unit,
- wherein the determining part determines whether the identification object is the bill or the paper sheet on which the bar code is printed based on the pixels converted by the converter.

6. The bill processing apparatus according to claim 1, comprising:
- a converter which converts the light received by the light receiving part into pixels containing color information including brightness, each of the pixels having a predetermined size as a unit,
- wherein the determining part determines whether the identification object is the bill or the paper sheet on which the bar code is printed based on the pixels converted by the converter.

7. An authenticity judgment processing method comprising:
- determining whether an identification object passing through a traveling route is a bill or a paper sheet on which a bar code is printed based on light from the identification object;
- changing a lighting interval of the light irradiated by the light emitting part in accordance with the identification object having been determined in the determining step; and
- judging an authenticity of the identification object.

8. The authenticity judgment processing method according to claim 7, wherein the predetermined lighting interval in the step of controlling is:
- a first lighting interval when the identification object is determined to be the bill in the determining step; or
- second lighting interval when the identification object is determined to be the paper sheet on which the bar code is printed in the determining step.

9. The authenticity judgment processing method according to claim 8, wherein:
- the light emitting part comprises a plurality of light sources,
- the method comprising the step of: selecting a predetermined light source among the plurality of light sources in accordance with the identification object having been determined in the determining step.

10. The authenticity judgment processing method according to claim 7, wherein:
- the light emitting part comprises a plurality of light sources,
- the method comprising the step of: selecting a predetermined light source among the plurality of light sources in accordance with the identification object having been determined in the determining step.

* * * * *